(12) United States Patent
O'Krafka et al.

(10) Patent No.: US 10,185,658 B2
(45) Date of Patent: *Jan. 22, 2019

(54) EFFICIENT IMPLEMENTATION OF OPTIMIZED HOST-BASED GARBAGE COLLECTION STRATEGIES USING XCOPY AND MULTIPLE LOGICAL STRIPES

(71) Applicant: SanDisk Technologies LLC, Plano, TX (US)

(72) Inventors: Brian W. O'Krafka, Austin, TX (US); Vladislav Bolkhovitin, San Jose, CA (US); Vivek Shivhare, Bangalore (IN)

(73) Assignee: SANDISK TECHNOLOGIES LLC, Plano, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/208,540

(22) Filed: Jul. 12, 2016

(65) Prior Publication Data

US 2017/0242790 A1 Aug. 24, 2017

Related U.S. Application Data

(60) Provisional application No. 62/298,939, filed on Feb. 23, 2016.

(51) Int. Cl.
*G06F 3/06* (2006.01)
*G06F 12/02* (2006.01)
*G06F 11/10* (2006.01)

(52) U.S. Cl.
CPC ........ *G06F 12/0253* (2013.01); *G06F 3/0604* (2013.01); *G06F 3/0644* (2013.01);
(Continued)

(58) Field of Classification Search
CPC .............................. G06F 3/0646–3/065; G06F 12/0253–12/0276
See application file for complete search history.

(56) References Cited

U.S. PATENT DOCUMENTS 7,710,777 B1 * 5/2010 Montierth .............. G11C 16/10 365/185.09
7,996,642 B1 * 8/2011 Smith .................. G06F 12/0246 711/154

(Continued)

FOREIGN PATENT DOCUMENTS

WO WO 2015/047398 4/2015

OTHER PUBLICATIONS

Wilson's : "Working Draft SCSI Extended Copy Command," Apr. 2, 1999, http://www.t10.org/ftp/t10/document.99/99-143r1.pdf, 34 pages.

(Continued)

*Primary Examiner* — Nathan Sadler
(74) *Attorney, Agent, or Firm* — Morgan, Lewis & Bockius LLP

(57) ABSTRACT

Systems, methods and/or devices are used for efficient implementation of optimized host-based garbage collection strategies using xcopy and arrays of flash devices. In one aspect, a method of managing a storage system having one or more storage devices includes a host-based garbage collection operation that includes identifying two or more logical stripes in accordance with data storage information stored at the host system, and enabling a process of coalescing valid data in the two or more logical stripes. Further, the use of an internal copy operation (e.g., xcopy), allows the host-based garbage collection operation to occur without transferring data back to the host, thus minimizing the number of I/O operations between the host and storage devices. Additionally, use of the host-based garbage collection operation allows more sophisticated garbage collection algorithms (e.g., matching the current workload) to be used, and ensures that multiple logical stripes are available to write data.

26 Claims, 10 Drawing Sheets

(52) U.S. Cl.
CPC .......... *G06F 3/0647* (2013.01); *G06F 3/0652* (2013.01); *G06F 3/0688* (2013.01); *G06F 12/0246* (2013.01); *G06F 11/1076* (2013.01); *G06F 2212/1036* (2013.01); *G06F 2212/7201* (2013.01); *G06F 2212/7205* (2013.01)

(56) References Cited

U.S. PATENT DOCUMENTS

| | | | |
|---|---|---|---|
| 8,316,201 | B2 | 11/2012 | Stern et al. |
| 9,158,681 | B1 | 10/2015 | Samuels et al. |
| 9,170,938 | B1 | 10/2015 | Walsh et al. |
| 9,229,854 | B1* | 1/2016 | Kuzmin ................. G06F 8/654 |
| 9,720,596 | B1 | 8/2017 | Bono et al. |
| 2003/0229627 | A1 | 12/2003 | Carlson et al. |
| 2004/0167898 | A1 | 8/2004 | Margolus et al. |
| 2006/0159109 | A1 | 7/2006 | Lamkin et al. |
| 2007/0156842 | A1 | 7/2007 | Vermeulen et al. |
| 2007/0174309 | A1 | 7/2007 | Pettovello |
| 2007/0185902 | A1 | 8/2007 | Messinger et al. |
| 2009/0012976 | A1 | 1/2009 | Kang et al. |
| 2009/0119450 | A1 | 5/2009 | Saeki et al. |
| 2011/0145512 | A1 | 6/2011 | Adl-Tabatabai et al. |
| 2011/0252067 | A1 | 10/2011 | Marathe et al. |
| 2012/0005419 | A1 | 1/2012 | Wu et al. |
| 2012/0117328 | A1 | 5/2012 | McKean et al. |
| 2012/0166360 | A1 | 6/2012 | Shah et al. |
| 2012/0179645 | A1 | 7/2012 | Lomet et al. |
| 2012/0259863 | A1 | 10/2012 | Bodwin et al. |
| 2014/0075100 | A1* | 3/2014 | Kaneko .............. G06F 12/0246 711/103 |
| 2014/0185376 | A1 | 7/2014 | Sinclair et al. |
| 2014/0189211 | A1* | 7/2014 | George ................ G06F 3/0613 711/103 |
| 2014/0215129 | A1* | 7/2014 | Kuzmin ............. G06F 12/0246 711/103 |
| 2014/0281138 | A1 | 9/2014 | Karamcheti et al. |
| 2015/0193488 | A1 | 7/2015 | Demidov et al. |
| 2015/0212752 | A1 | 7/2015 | Nemazie et al. |
| 2015/0242307 | A1 | 8/2015 | Busaba et al. |
| 2015/0253999 | A1 | 9/2015 | Nemazie et al. |
| 2015/0277794 | A1 | 10/2015 | Tudor et al. |
| 2015/0278093 | A1 | 10/2015 | O'Krafka et al. |
| 2015/0281389 | A1 | 10/2015 | Firsov et al. |
| 2015/0370492 | A1 | 12/2015 | Satnur et al. |
| 2015/0370701 | A1 | 12/2015 | Higgins et al. |
| 2015/0378884 | A1 | 12/2015 | Nemazie et al. |
| 2016/0034507 | A1 | 2/2016 | Aron et al. |
| 2016/0085464 | A1* | 3/2016 | Tuers .................... G06F 11/073 714/704 |
| 2016/0132265 | A1 | 5/2016 | Yi et al. |
| 2016/0299715 | A1* | 10/2016 | Hashimoto .......... G06F 3/0619 |
| 2016/0321010 | A1* | 11/2016 | Hashimoto .......... G06F 3/0659 |
| 2016/0321294 | A1 | 11/2016 | Wang et al. |
| 2016/0335299 | A1 | 11/2016 | Vemulapati et al. |
| 2017/0075781 | A1 | 3/2017 | Bennett, Jr. et al. |
| 2017/0220292 | A1* | 8/2017 | Hashimoto .......... G06F 3/0641 |
| 2017/0242785 | A1* | 8/2017 | O'Krafka ............ G06F 12/0246 |

OTHER PUBLICATIONS

International Search Report and Written Opinion dated Nov. 7, 2016, received in International Patent Application No. PCT/US2016/051717, which corresponds to U.S. Appl. No. 14/929,171, 13 pages (Shelton).

International Search Report and Written Opinion dated Mar. 15, 2017, received in International Patent Application No. PCT/US2016/067728, which corresponds to U.S. Appl. No. 15/208,540, 14 pages (O'Krafka).

International Search Report and Written Opinion dated Jun. 30, 2015, received in International Patent Application No. PCT/US2015/023927, which corresponds to U.S. Appl. No. 14/454,687, 11 pages (Kadayam).

International Search Report and Written Opinion dated Sep. 14, 2016, received in International Patent Application No. PCT/US2016/036720, which corresponds to U.S. Appl. No. 15/144,704, 12 pages (Cheru).

* cited by examiner

Secondary Mapping Table 236

| Node Logical ID | A | B | C | D | ... |
|---|---|---|---|---|---|
| Node Physical Location | 5014 | 183 | 476 | 813 | ... |

EFFICIENT IMPLEMENTATION OF OPTIMIZED HOST-BASED GARBAGE COLLECTION STRATEGIES USING XCOPY AND MULTIPLE LOGICAL STRIPES

RELATED APPLICATIONS

This application claims priority to U.S. Provisional Patent Application No. 62/298,939, filed Feb. 23, 2016, which is hereby incorporated by reference in its entirety.

TECHNICAL FIELD

The disclosed embodiments relate generally to memory systems, sometimes called data storage systems, and in particular, to efficient implementation of optimized host-based garbage collection strategies using arrays of flash devices and host-determined commands to copy valid data internally to the storage system.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Since flash memory can only be programmed and erased a limited number of times, it is important to optimize memory management schemes (e.g., garbage collection, wear leveling, caching, etc.) to enhance performance and endurance of memory devices. Garbage collection is a process of memory management that reclaims portions of memory that no longer contain valid data. Using flash memory as an example, data is written to flash memory in units called pages, which are made up of multiple memory cells. However, flash memory is erased in larger units called blocks, which are made up of multiple pages. If some pages of a first block contain invalid data, those pages cannot be overwritten until the whole block containing those pages is erased. The process of garbage collection reads and re-writes the pages with valid data from the first block into a second block and then erases the first block. After garbage collection, the second block contains pages with valid data and free pages that are available for new data to be written. Since flash memory can only be programmed and erased a limited number of times, it is important to utilize a garbage collection scheme that maximizes or improves the life of a flash-based storage system.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable efficient implementation of optimized host-based garbage collection strategies using arrays of flash devices and host-determined commands (e.g., xcopy) to copy valid data internally to a storage system. In one aspect, a method of managing a storage system having one or more storage devices includes a host-based garbage collection operation that includes identifying two or more logical stripes in accordance with data storage information stored at the host system, and enabling a process of coalescing valid data in the two or more logical stripes. The coalescing process includes moving the valid data in the two or more logical stripes, and repacking valid logical addresses (i.e., logical addresses at which valid data is stored) to the beginning of each of the two or more logical stripes. As a result, host-based garbage collection (e.g., garbage collection that better matches changing workloads) is used to accomplish most of the garbage collection required by the storage system, and multiple logical stripes are available to group write data (e.g., data grouped according to expected lifetimes).

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

DETAILED DESCRIPTION

Figure 1:
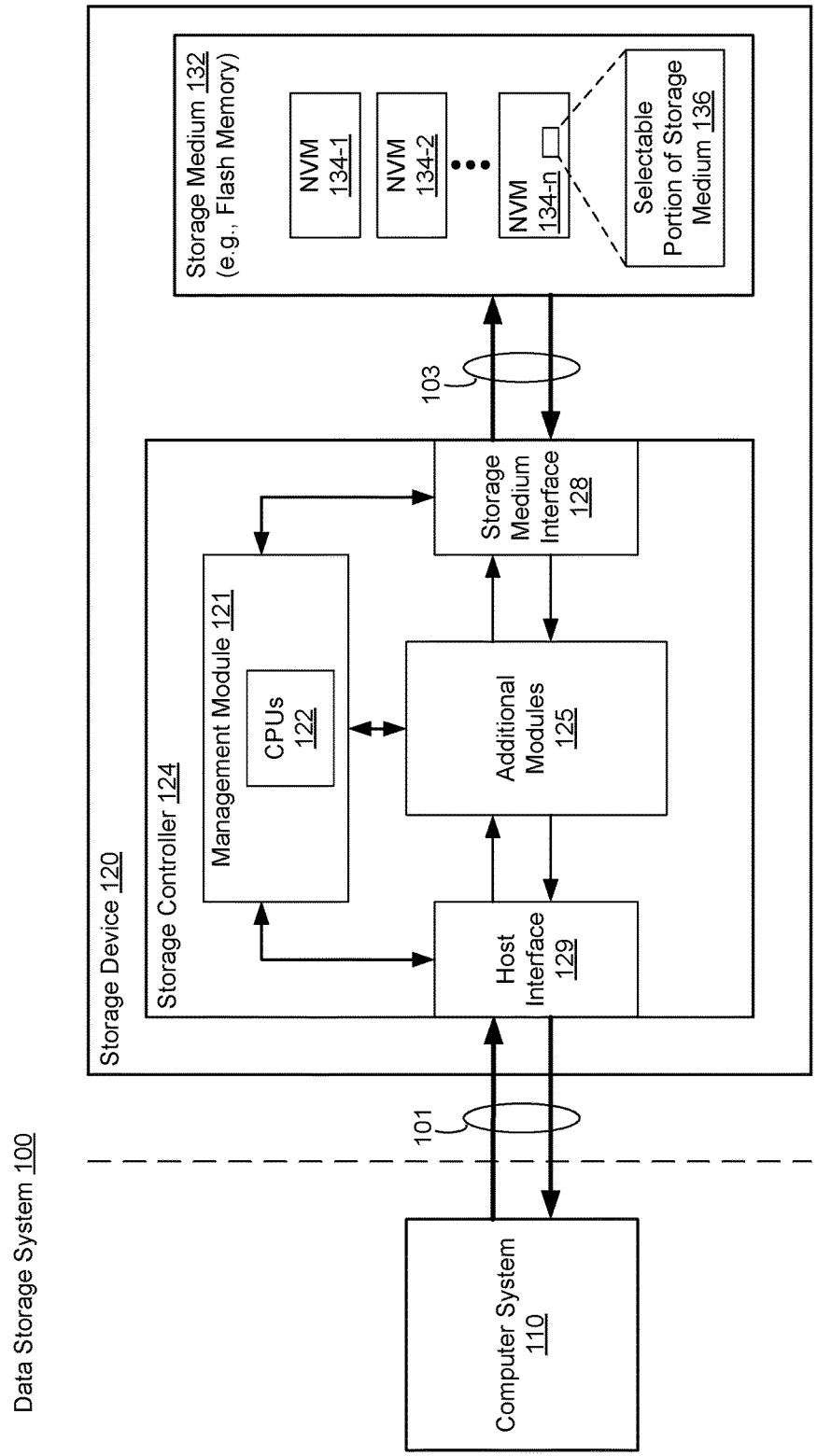
FIG. 1 is a block diagram illustrating an implementation of a data storage system, in accordance with some embodiments.

Non-volatile memory systems are often used to store a database of information, such as a database in which data objects and their attributes are stored. The database is typically organized and stored as a tiered data structure, for example a tree data structure (e.g., a B-tree) having nodes in which data objects, pointers to the data objects, and attributes (sometimes called metadata) are stored. When an object is written, some mapping algorithms (e.g., B-tree based mapping algorithms) require a minimum of two I/O operations: one to write data and one to write updated metadata (e.g., for changes to a leaf B-tree node). For these mapping algorithms, performance is improved by employing write serialization, which avoids extra I/O operations by serializing multiple small writes into an entire stripe before writing to storage. In some embodiment of the methods and systems described below, in order to effectively perform write serialization, a host performs garbage collection to reclaim contiguous regions of free space within the target stripe. The various embodiments described herein include systems, methods and/or devices used to enable efficient implementation of optimized host-based garbage collection strategies using arrays of flash devices and host-determined internal copy operations (e.g., xcopy) for copying valid data within a storage system. Some embodiments include systems, methods and/or devices to identify two or more logical stripes in accordance with data storage information stored at the host system, and to enable a process of coalescing valid data in the two or more logical stripes, the coalescing process including moving the valid data in each identified logical stripe and repacking valid logical addresses (i.e., logical addresses at which valid data is stored) to a contiguous portion of a corresponding target logical strip (e.g., at the beginning of the target logical stripe), the target logical stripe comprising the respective logical stripe or another logical stripe distinct from the respective logical stripe.

(A1) More specifically, some embodiments include a method of managing a storage system having a plurality of storage devices. In some embodiments, the method includes, at a host system that is distinct from the plurality of storage devices, performing a host-based garbage collection operation, including: identifying, in accordance with data storage information stored at the host system, two or more logical stripes, each logical stripe corresponding to a contiguous sequence of logical addresses in a logical address space of the host system, wherein the respective contiguous sequence of logical addresses for each logical stripe corresponds to one or more contiguous sequences of physical addresses in a physical address space of the plurality of storage devices. Further, the host-based garbage collection operation includes coalescing valid data in the two or more logical stripes, including, for each contiguous sequence of valid logical addresses in the two or more logical stripes: (1) sending instructions from the host system to one or more storage devices of the plurality of storage devices to move data corresponding to the respective contiguous sequence of valid logical addresses from a first physical location in the physical address space to a second physical location in the physical address space; and (2) for each respective logical stripe of the two or more logical stripes, repacking valid logical addresses in the respective logical stripe to a contiguous portion of a target logical stripe, the target logical stripe comprising the respective logical stripe or another logical stripe distinct from the respective logical stripe.

(A2) In some embodiments of the method of A1, identifying the two or more logical stripes includes determining how many logical stripes are needed for the host-based garbage collection operation.

(A3) In some embodiments of the method of any of A1 to A2, identifying the two or more logical stripe includes identifying the two or more logical stripes in accordance with a selection criteria.

(A4) In some embodiments of the method of any of A1 to A3, the method further includes: partitioning the plurality of storage devices into two or more regions, wherein a respective region of the two or more regions corresponds to a respective logical stripe of the two or more logical stripes.

(A5) In some embodiments of the method of A4, partitioning the plurality of storage devices includes: (1) determining how many regions are needed for the host-based garbage collection operation, (2) determining a size of the two or more regions, and (3) determining an over-provisioning amount for the two or more regions.

(A6) In some embodiments of the method of A4, partitioning the plurality of storage devices includes dynamically adjusting the two or more regions as workload of the storage system changes.

(A7) In some embodiments of the method of any of A1 to A6, the method further includes, after coalescing valid data in the two or more logical stripes: (1) classifying an incoming write request, and (2) selecting the logical stripe in which to place the incoming write request in accordance with a classification criteria.

(A8) In some embodiments of the method of any of A1 to A7, the two or more logical stripes include a first logical stripe and a second logical stripe and wherein the first logical stripe is used for data with a first set of characteristics and the second logical stripe is used for data with a second set of characteristics, distinct from the first set of characteristics.

(A9) In some embodiments of the method of any of A1 to A8, coalescing valid data in the two or more logical stripes includes migrating data between distinct logical stripes of the two or more logical stripes in accordance with a migration criteria.

(A10) In some embodiments of the method of any of A1 to A9, sending instructions from the host system to the one or more storage devices to move data corresponding to the respective contiguous sequence of valid logical addresses includes issuing one or more xcopy commands to the one or more storage devices.

(A11) In some embodiments of the method of any of A1 to A10, the instructions to move data comprise copy instructions that copy data corresponding to valid logical addresses in the two or more logical stripes from initial memory portions in the plurality of storage devices to different memory portions in the plurality of storage devices corresponding to new logical addresses in the two or more logical stripes.

(A12) In some embodiments of the method of any of A1 to A11, the method further includes: for each contiguous sequence of valid logical addresses in the two or more logical stripes, after sending said instructions, invalidating the data corresponding to the respective contiguous sequence of valid logical addresses at the first physical location in the physical address space.

(A13) In some embodiments of the method of any of A1 to A12, the method further includes: in accordance with a determination that first garbage collection scheduling criteria of the storage system are met, triggering performance of the host-based garbage collection operation, wherein the first garbage collection scheduling criteria of the storage system are independent of second garbage collection scheduling criteria used to trigger performance of internal garbage collection operations within each storage device of the plurality of storage devices.

(A14) In some embodiments of the method of A13, performance of the host-based garbage collection operation is triggered so as to ensure that internal garbage collection operations within each storage device are minimized.

(A15) In some embodiments of the method of A13, the first garbage collection scheduling criteria include criteria corresponding to a write operation workload of the storage system.

(A16) In some embodiments of the method of A13, the first garbage collection scheduling criteria include criteria corresponding to a projected workload of the storage system.

(A17) In some embodiments of the method of A13 or A16, the first garbage collection scheduling criteria include criteria corresponding to a number of empty logical stripes in the storage system.

(A18) In some embodiments of the method of any of A13, A16 and A17, the method further includes: modifying the first garbage collection scheduling criteria in accordance with changes in workload of the storage system over time.

(A19) In some embodiments of the method of any of A1 to A18, the method further includes: repeatedly performing, over a period of time, said host-based garbage collection operation to ensure that at least a minimum number of logical stripes managed by the host system are available in which to place write data.

(A20) In some embodiments of the method of any of A1 to A19, the method is controlled by a host that includes a client on behalf of which data is stored in the storage system.

(A21) In some embodiments of the method of any of A1 to A19, the method is controlled by a host that includes a storage system controller of the storage system.

(A22) In some embodiments of the method of any of A1 to A19, the method is controlled by a host that includes a cluster controller of the storage system.

(A23) In some embodiments of the method of any of A1 to A22, the plurality of storage devices comprises one or more flash memory devices.

(A24) In another aspect, a host system includes an interface for operatively coupling to a storage system having a plurality of storage devices, one or more processors, and memory (e.g., non-volatile memory or volatile memory in or coupled to the controller) storing one or more programs. The one or more programs include instructions that when executed by the one or more processors cause the host system, which is distinct from the plurality of storage devices, to perform a host-based garbage collection operation including: identifying, in accordance with data storage information stored at the host system, two or more logical stripes, each logical stripe corresponding to a contiguous sequence of logical addresses in a logical address space of the host system, wherein the respective contiguous sequence of logical addresses for each logical stripe corresponds to one or more contiguous sequences of physical addresses in a physical address space of the plurality of storage devices. Further, the host-based garbage collection operation includes coalescing valid data in the two or more logical stripes, including, for each contiguous sequence of valid logical addresses in the two or more logical stripes: (1) sending instructions from the host system to one or more storage devices of the plurality of storage devices to move data corresponding to the respective contiguous sequence of valid logical addresses from a first physical location in the physical address space to a second physical location in the physical address space; and (2) for each respective logical stripe of the two or more logical stripes, repacking valid logical addresses in the respective logical stripe to a contiguous portion of a target logical stripe, the target logical stripe comprising the respective logical stripe or another logical stripe distinct from the respective logical stripe.

(A25) In some embodiments of the host system of A24, the one or more programs include a compacting module having instructions for moving valid data corresponding to the respective contiguous sequence of valid logical addresses from a first physical location in the physical address space to a second physical location in the physical address space and, for each logical stripe, repacking valid logical addresses in the respective logical stripe to a beginning of the respective logical stripe.

(A26) In some embodiments of the host system of A24 or A25, the one or more programs include instructions that when executed by the one or more processors cause the host system to perform or control performance of any of the methods A2 to A23 described herein.

(A27) In yet another aspect, any of the methods A1 to A23 described above are performed by a host system including means for performing any of the methods described herein.

(A28) In yet another aspect, a storage system includes a storage medium (e.g., comprising one or more non-volatile storage devices, such as flash memory devices), one or more processors, and memory (e.g., non-volatile memory or volatile memory in the storage system) storing one or more programs, which when executed by the one or more processors cause the storage system to perform or control performance of any of the methods A1 to A23 described herein.

(A29) In yet another aspect, some embodiments include a non-transitory computer readable storage medium, storing one or more programs configured for execution by one or more processors of a storage device, the one or more programs include instructions for performing any of the methods A1 to A23 described herein.

(A30) In yet another aspect, a storage system includes a plurality of storage devices, one or more subsystems having one or more processors, and memory storing one or more programs. The one or more programs include instructions that when executed by the one or more processors cause the storage system to perform operations including, at a host system that is distinct from the plurality of storage devices, performing a host-based garbage collection operation. The host-based garbage collection operation includes identifying, in accordance with data storage information stored at the host system, two or more logical stripes, each logical stripe corresponding to a contiguous sequence of logical addresses in a logical address space of the host system, wherein the respective contiguous sequence of logical addresses for each logical stripe corresponds to one or more contiguous sequences of physical addresses in a physical address space of the plurality of storage devices. Further, the host-based garbage collection operation includes coalescing valid data in the two or more logical stripes, including, for each contiguous sequence of valid logical addresses in the two or more logical stripes: (1) sending instructions from the host system to one or more storage devices of the plurality of storage devices to move data corresponding to the respective contiguous sequence of valid logical addresses from a first physical location in the physical address space to a second physical location in the physical address space; and (2) for each respective logical stripe of the two or more logical stripes, repacking valid logical addresses in the respective logical stripe to a contiguous portion of a target logical stripe, the target logical stripe comprising the respective logical stripe or another logical stripe distinct from the respective logical stripe.

(A31) In some embodiments of the storage system of A30, the one or more programs include instructions that when executed by the one or more processors cause the storage system to perform or control performance of any of the methods A2 to A23 described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices (e.g., NVM 134-1, NVM 134-2 through NVM 134-$n$) including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Memory devices (NVM 134-1, NVM 134-2, etc.) of storage medium 132 include addressable and individually selectable blocks, such as selectable portion of storage medium 136 (also referred to herein as selected portion 136). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable and writable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing and reading data to and from the flash memory device.

In some embodiments, storage controller 124 includes a management module 121, a host interface 129, a storage medium interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory).

In some embodiments, management module 121 includes one or more processing units 122 (also sometimes called processors, hardware processors, CPUs or the like) configured to execute instructions in one or more programs (e.g., in management module 121). In some embodiments, the one or more CPUs 122 are shared by one or more components within, and in some cases, beyond the function of storage controller 124. Management module 121 is coupled to host interface 129, additional module(s) 125 and storage medium interface 128 in order to coordinate the operation of these components. In some embodiments, one or more modules of management module 121 are implemented in computer system 110, as discussed in more detail below.

Additional module(s) 125 are coupled to storage medium interface 128, host interface 129, and management module 121. As an example, additional module(s) 125 may include an error control module to limit the number of uncorrectable errors inadvertently introduced into data during writes to memory or reads from memory. In some embodiments, an error control module, included in additional module(s) 125, includes an encoder and a decoder. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, a write operation is initiated when computer system (host) 110 sends one or more host write commands (e.g., via data connections 101, or alternatively a separate control line or bus) to storage controller 124. In response, storage controller 124 sends one or more write access commands to storage medium 132, from storage medium interface 128 (e.g., via data connections 103, or alternatively a separate control line or bus), to write data to physical memory locations (addresses) within storage medium 132.

In some embodiments, during a write operation, host interface 129 receives data to be stored in storage medium 132 from computer system 110. The data received by host interface 129 is made available to an encoder (e.g., in additional module(s) 125), which encodes the data.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, from storage medium interface 128 (e.g., via data connections 103, or alternatively a separate control line or bus), to obtain raw read data in accordance with physical memory locations (addresses) within storage medium 132.

In some embodiments, storage medium interface 128 provides the raw read data to a decoder (e.g., in additional module(s) 125). If the decoding is successful, the decoded data is provided to host interface 129, where the decoded data is made available to computer system 110, or is provided to computer system 110 as a response to the host read command. In some embodiments, if the decoding is not successful, storage controller 124 may resort to a number of remedial actions or provide an indication of an irresolvable error condition.

As explained above, a storage medium (e.g., storage medium 132) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells (SLC) or multi-level cells (MLC)). In some embodiments, programming is performed on an entire page.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages with valid data in that block are read and re-written to a new block and the old block (i.e., the erase block in which the valid data was stored prior to the data being re-written to the new block) is erased (or put on a queue for erasing). This process is called garbage collection. After garbage collection, the new block contains pages with valid data and free pages that are available for new data to be written, and the old block that was erased is also available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 132) is a multiple of the logical amount of data intended to be written by a host (e.g., computer system 110, sometimes called a host). As discussed above, when a storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\frac{\text{amount of data written to a storage medium}}{\text{amount of data written by a host}} \quad (1)$$

One of the goals of any storage system architecture is to reduce write amplification as much as possible so that available endurance is used to meet storage medium reliability and warranty specifications. Higher system endurance also results in lower cost as the storage system may need less over-provisioning. By reducing the write amplification, the endurance of the storage medium is increased and the overall cost of the storage system is decreased. Generally, garbage collection is performed on erase blocks with the fewest number of valid pages for best performance and best write amplification. However, since different erase blocks have different wear characteristics, it is important to use erase blocks based on how much life a respective erase block has left, rather than simply the number of program-erase cycles performed on the respective erase block thus far.

Figure 2A:
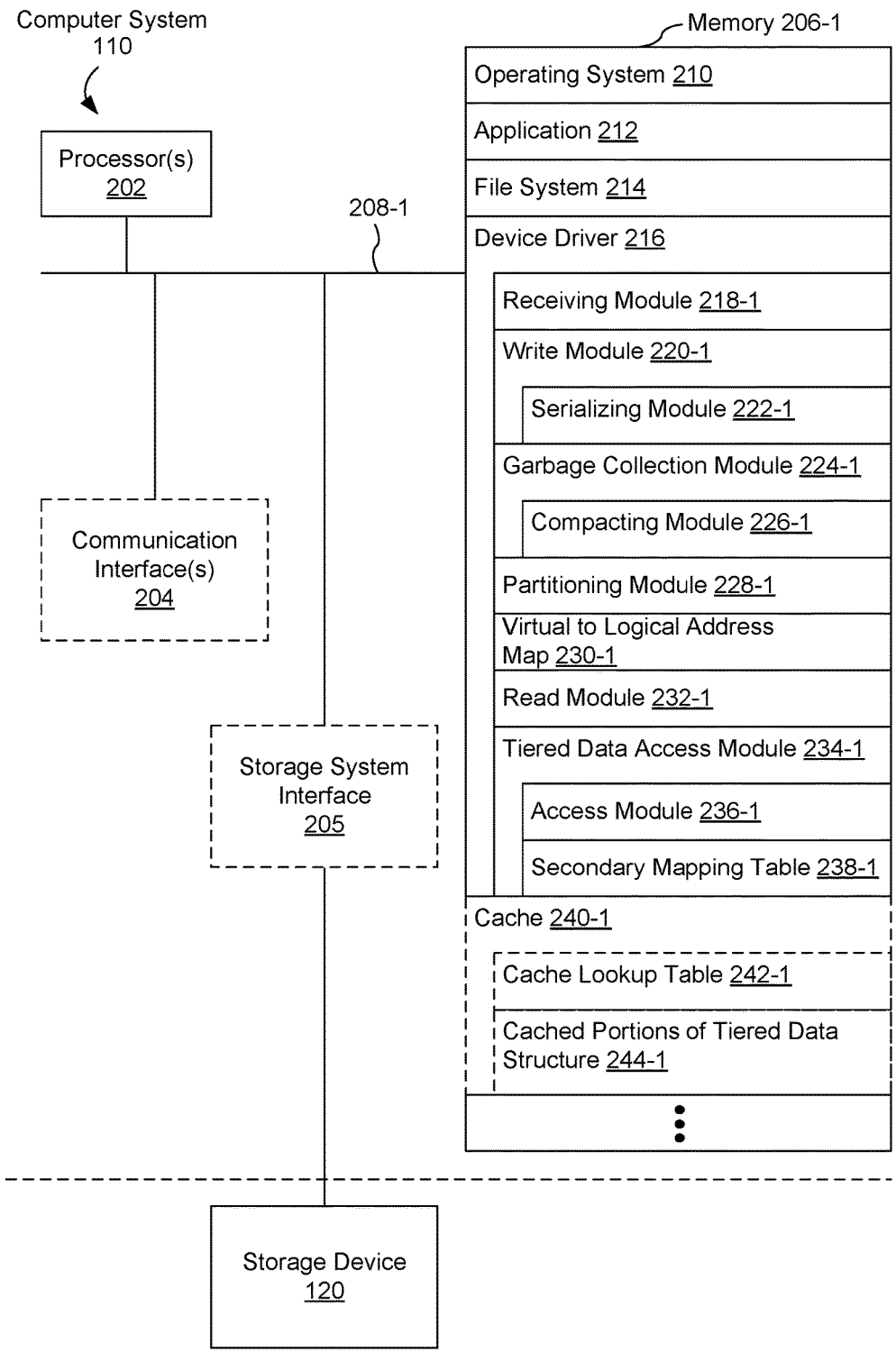
FIG. 2A is a block diagram illustrating a host computing device, in accordance with some embodiments.

FIG. 2A is a block diagram illustrating an implementation of a computer system 110, in accordance with some embodiments. Computer system 110 typically includes one or more processors 202 (also sometimes called CPUs, processing units, hardware processors, microprocessors or microcontrollers) for executing modules, programs and/or instructions stored in memory 206-1 and thereby performing processing operations, memory 206-1, and one or more communication buses 208-1 for interconnecting these components. Communication buses 208-1 optionally include circuitry (sometimes called a chipset) that interconnects and controls communications between system components. In some embodiments, such as those represented by FIG. 1, computer system 110 is coupled to storage device 120 by communication buses 208-1 and a storage system interface 205. In some embodiments, computer system 110, includes one or more communication interfaces 204 for coupling computer system 110 to other systems (not shown), e.g., via a communications network such as the internet, an intranet, or local area network, or the like.

Memory 206-1 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-1 optionally includes one or more storage devices remotely located from processor(s) 202. Memory 206-1, or alternately the non-volatile memory device(s) within memory 206-1, comprises a non-transitory computer readable storage medium. In some embodiments, memory 206-1, or the computer readable storage medium of memory 206-1 stores the following programs, modules, and data structures, or a subset thereof:

- an operating system 210, which includes procedures for handling various basic system services and for performing hardware dependent tasks;
- an application 212;
- a file system 214;
- a device driver 216 for accessing storage device 120, including:
  - a receiving module 218-1 used for receiving host access commands;
  - a write module 220-1 used for writing data to storage device 120, including:
    - a serializing module 222-1 used for serializing multiple small write data operations into a single larger write data operation;
  - a garbage collection module 224-1 used for controlling a garbage collection process in a storage medium (e.g., storage medium 130, FIG. 1) including:
    - a compacting module 226-1 used for moving valid data and repacking valid logical addresses (i.e., logical addresses at which valid data is stored);
  - a partitioning module 228-1 used for partitioning storage devices (e.g., storage device 120, FIG. 1) into two or more regions;
  - a virtual to logical address map 230-1 used for maintaining one or more mappings of virtual addresses (e.g., virtual addresses used by applications executed by computer system 110) to logical addresses in a logical address space of computer system 110; in some embodiments, logical addresses are the addresses sent by computer system 110 to storage device 120 when read, write and unmap commands are sent by computer system 110 to storage device 120; however, in some other embodiments, computer system 110 also maintains a mapping of logical addresses to physical addresses in a physical address space of storage device 120;
  - a read module 232-1 used for reading data from storage device 120;
  - a tiered data structure access module 234-1 used for accessing a tiered data structure (e.g., tiered data structure 300, FIG. 3, which may be stored in storage medium 132 of storage device 120), including:
    - an access module 236-1 used for accessing nodes within the tiered data structure; and
    - a secondary mapping table 238-1 used for translating logical IDs of leaf nodes to physical locations of leaf nodes;
  - a cache 240-1 for caching mapping data, including:
    - a cache lookup table 242-1 for locating nodes of a tiered data structure stored (i.e., cached) in cache 240-1; and
    - cached portions 244-1 of a tiered data structure (e.g., tiered data structure 300, FIG. 3) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-1 may store a subset of the modules and data structures identified above. Furthermore, memory 206-1 may store additional modules and data structures not described above. In some embodiments, the programs, modules, and data structures stored in memory 206-1, or the computer readable storage medium of memory 206-1, provide instructions for implementing respective operations in the methods described below with reference to FIGS. 3, 4, 5, and 6A-6D.

Although FIG. 2A shows computer system 110 in accordance with some embodiments, FIG. 2A is intended more as a functional description of the various features which may be present in computer system 110 than as a structural schematic of the embodiments described herein. In practice, and as recognized by those of ordinary skill in the art, the programs, modules, and data structures shown separately could be combined and some programs, modules, and data structures could be separated.

Figures 2B, 2C:
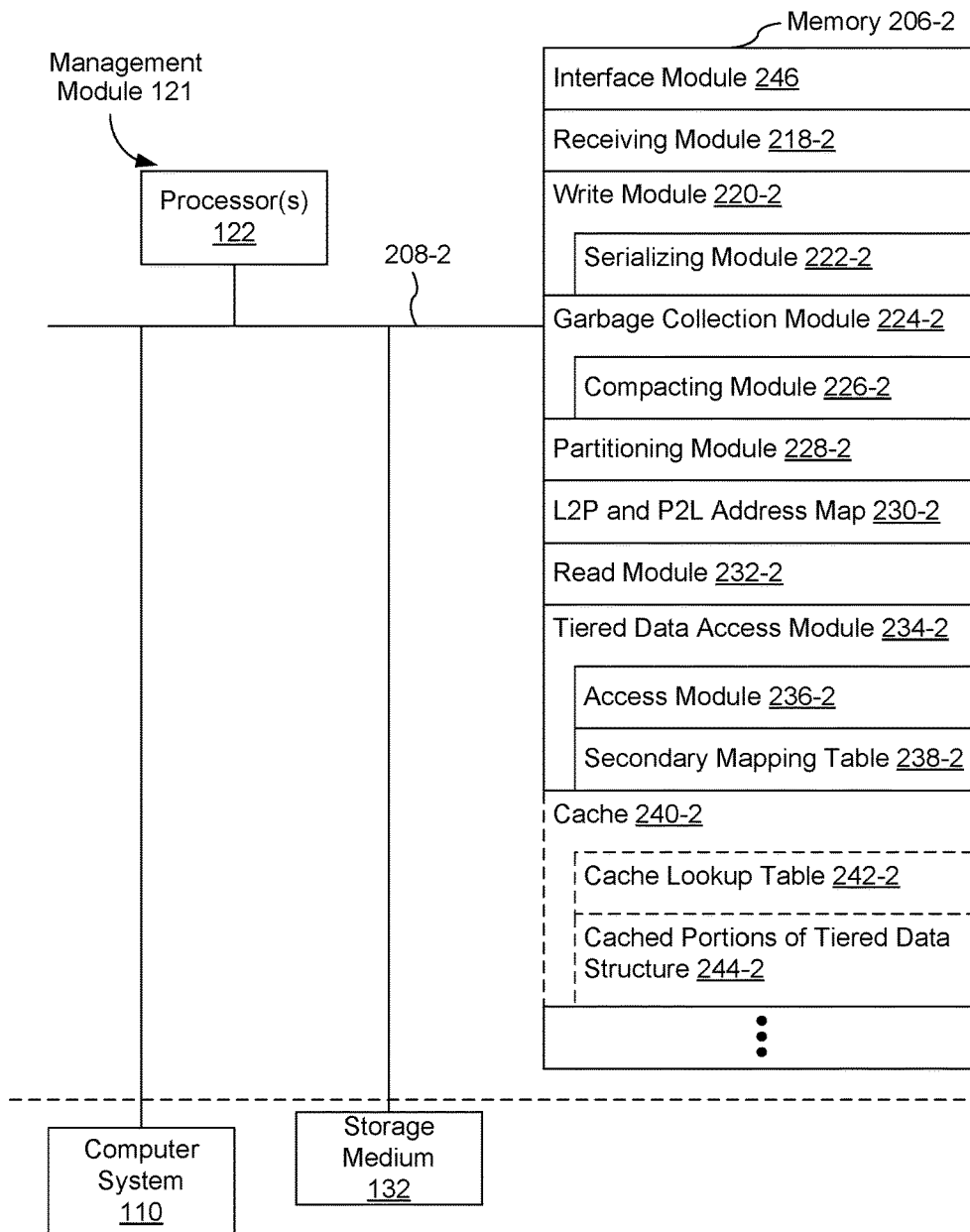
FIG. 2B is a block diagram illustrating a memory management module of a non-volatile memory controller, in accordance with some embodiments.
FIG. 2C is a diagram illustrating a secondary mapping table included in FIGS. 2A and 2B in accordance with some embodiments.

FIG. 2B is a block diagram illustrating an implementation of a management module 121, in accordance with some embodiments. Management module 121 typically includes one or more processors 122 (also sometimes called CPUs, processing units, hardware processors, microprocessors or microcontrollers) for executing modules, programs and/or instructions stored in memory 206-2 and thereby performing processing operations, memory 206-2, and one or more communication buses 208-2 for interconnecting these components. Communication buses 208-2 optionally include circuitry (sometimes called a chipset) that interconnects and controls communications between system components. In some embodiments, such as those represented by FIG. 1, management module 121 is coupled to computer system 110 and storage medium 132 by communication buses 208-2. Memory 206-2 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-2 optionally includes one or more storage devices remotely located from processor(s) 122. Memory 206-2, or alternately the non-volatile memory device(s) within memory 206-2, comprises a non-transitory computer readable storage medium. In some embodiments, memory 206-2, or the computer readable storage medium of memory 206-2 stores the following programs, modules, and data structures, or a subset thereof:

- an interface module 246 that is used for communicating with other components, such as non-volatile memory devices 134;
- a receiving module 218-2 for receiving host access commands;
- a write module 220-2 used for writing data to non-volatile memory devices 134, including:
  - a serializing module 222-2 used for serializing multiple small write data operations into a single larger write data operation;
- a garbage collection module 224-2 used for controlling a garbage collection process in a storage medium (e.g., storage medium 130, FIG. 1) including:
  - a compacting module 226-2 used for moving valid data and repacking valid logical addresses (i.e., logical addresses at which valid data is stored);
- a partitioning module 228-2 used for partitioning storage devices (e.g., storage device 120, FIG. 1) into two or more regions;
- a logical to physical (L2P) and physical to logical (P2L) address map 230-2 used for maintaining a mapping of logical addresses to physical addresses and vice versa;
- a read module 232-2 used for reading from non-volatile memory devices 134;
- a tiered data structure access module 234-2 used for accessing a tiered data structure (e.g., tiered data structure 300, FIG. 3, which may be stored in storage medium 132 of storage device 120), including:
  - an access module 236-2 used for accessing nodes within a tiered data structure;
  - a secondary mapping table 238-2 used for translating logical IDs of leaf nodes to physical locations of leaf nodes;
- a cache 240-2 for caching mapping data, including:
  - a cache lookup table 242-2 for locating nodes of a tiered data structure stored (i.e., cached) in cache 240-2; and
  - cached portions 244-2 of a tiered data structure (e.g., tiered data structure 300, FIG. 3) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-2 may store a subset of the modules and data structures identified above. Furthermore, memory 206-2 may store additional modules and data structures not described above. In some embodiments, the programs, modules, and data structures stored in memory 206-2, or the computer readable storage medium of memory 206-2, provide instructions for implementing respective operations in the methods described below with reference to FIGS. 3, 4, 5, and 6A-6D.

Although FIG. 2B shows management module 121 in accordance with some embodiments, FIG. 2B is intended more as a functional description of the various features which may be present in management module 121 than as a structural schematic of the embodiments described herein. In practice, and as recognized by those of ordinary skill in the art, the programs, modules, and data structures shown separately could be combined and some programs, modules, and data structures could be separated.

FIG. 2C is a diagram illustrating a secondary mapping table 238 included in FIGS. 2A and 2B, in accordance with some embodiments. In some embodiments, secondary mapping table 238 is used for translating logical IDs of nodes of a tiered data structure to the corresponding physical locations of the corresponding nodes. For example, as shown in FIG. 2C, node logical ID "A" is translated to node physical location "5014," and similarly node logical ID "B" is translated to node physical location "183." In some embodiments, secondary mapping table 238 is a hash table that has an associated hash function that hashes a key (e.g., logical ID of a node in a tiered data structure) to a corresponding value (e.g., physical location of a node in a tiered data structure). For example, the hash function in FIG. 2C would hash key "A," to value "5014." Alternately, in some embodiments, secondary mapping table 238 may be organized in any manner that facilitates efficient lookup operations, e.g., binary tree, content addressable memory, or the like.

Figure 3:
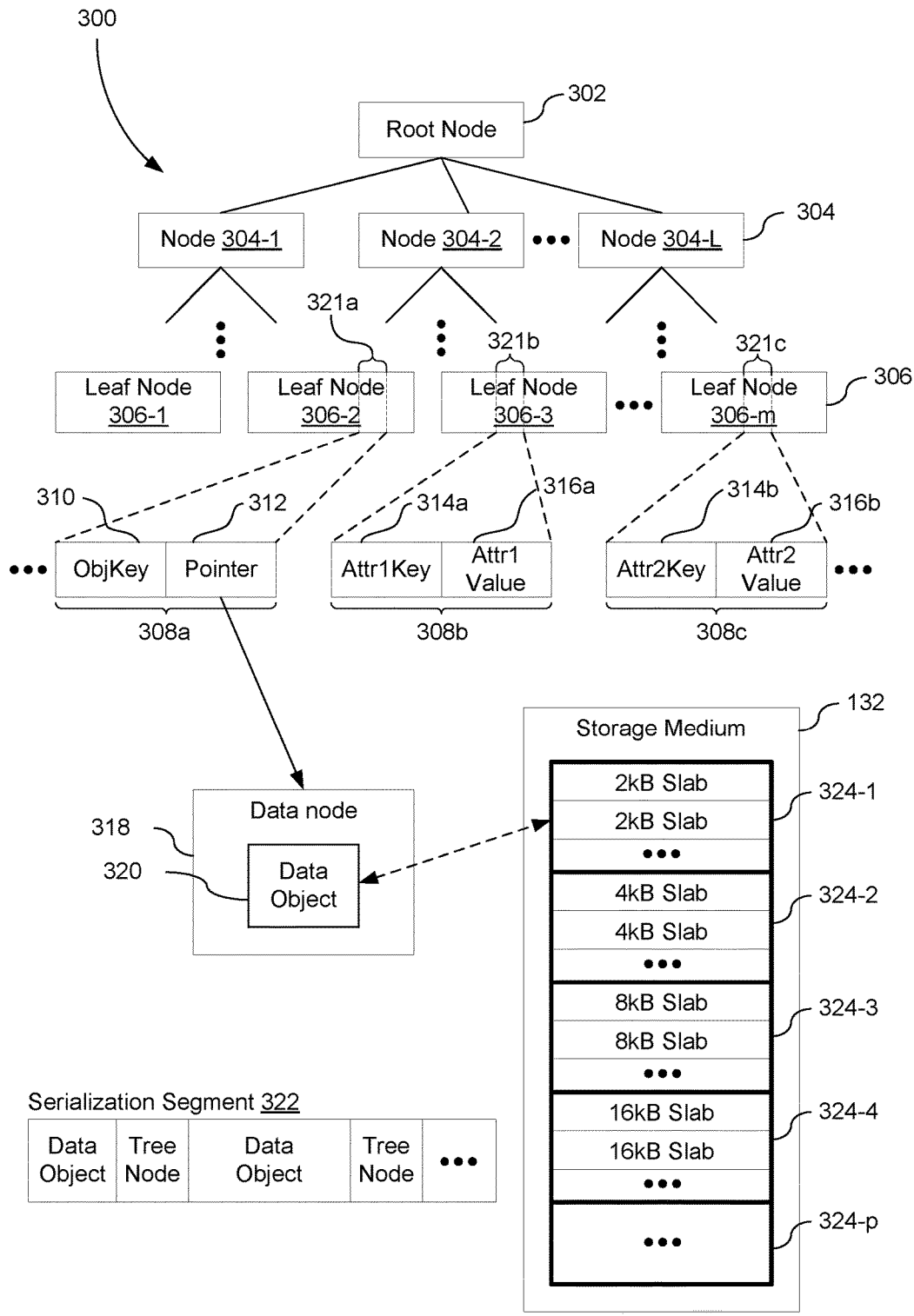
FIG. 3 is a conceptual diagram of a tiered data structure, in accordance with some embodiments.

FIG. 3 is a simplified, conceptual diagram of a tiered data structure 300 (e.g., a B-tree), a type of data structure that is commonly used in databases and file systems. The root node 302 is the highest point within the tiered data structure 300 and serves as the parent node for all other nodes within the tiered data structure (i.e., the root node has a node depth of zero). In some embodiments, beneath the root node 302 are internal (non-leaf) nodes 304 (e.g., Nodes 304-1-304-L) and leaf nodes 306 (e.g., Leaf Nodes 306-1-306-m). Internal nodes 304 may have a variable number of child nodes. Furthermore, each leaf node and internal node other than root node 302 has a parent node containing entries that point to or otherwise reference its child nodes. A child node with no child nodes of its own is called a leaf node. Entries in the leaf nodes 306 point to or otherwise reference specific data nodes 318, or specific data objects 320 stored within specific data nodes 318, which may be stored in non-volatile memory such as storage medium 132.

In some embodiments, non-volatile memory is organized into groups of fixed size segments (e.g., segments 324-1, 324-2 through 324-p). Each segment is further partitioned into a group of fixed size slabs. All the slabs within a particular segment have the same size (e.g., segment 324-1 is a 2 kB slab segment). Optionally, a variety of slab sizes are supported by dividing the full set of segments into groups, with a different slab size for each group. In some embodiments, data object 320 is stored in a slab within a segment. Such a situation is depicted in FIG. 3, wherein data object 320 is stored in a 2 kB slab of segment 324-1 in storage medium 132.

In some embodiments, various portions of the tiered data structure 300 are cached in volatile memory (e.g., in DRAM). For example, in one embodiment, all of the internal nodes 304 are cached, but only a portion of the leaf nodes 306 are cached. In another embodiment, all of the internal nodes 304, and none of the leaf nodes 306 are cached. In some embodiments, the portion of the leaf nodes that is cached is determined by how frequently the corresponding data objects are accessed. For example, leaf nodes corresponding to data objects accessed more frequently than other data objects, by a predefined margin, are added to the portion of the leaf nodes that are cached, and leaf nodes corresponding to data objects that are accessed less frequently than other data objects, by a predefined margin, are removed from or not added to the cache. The caching of portions of the tiered data structure can help reduce the number of I/O operations required to perform data access operations, for example by avoiding additional I/O operations to access nodes stored in storage medium 132 in storage device 120.

In some embodiments, each node (i.e., root node 302, internal nodes 304, and leaf nodes 306) of the tiered data structure 300 has a corresponding logical ID, which is used to access the node using a hash table (e.g., secondary mapping table 238-1, FIG. 2A). The hash table is used to translate the logical ID of a node to its physical location in non-volatile memory. In some embodiments, when a respective node (e.g., leaf node 306) is modified, the updated or modified node is written to a different physical location, and the hash table is updated without changing the nodes above the modified node (e.g., leaf node 306-1 is modified and internal node 304-1 and root node 302 are not updated). The nodes above the modified node do not need to be modified because the logical ID of the modified node remains unchanged, and thus the content of the parent of the modified node, which includes the logical ID of the modified node, is not affected by the modification of the respective node. Updating the hash table without modifying the internal and root nodes avoids additional I/O operations. Further, updating the hash table without modifying the internal and root nodes decreases writes to the non-volatile memory and thus decreases write-amplification.

A leaf node 306 may store a variable number of keys and values. Often included amongst these keys and values are data object keys 310, data object pointers 312, attribute keys 314 (e.g., attribute key 314a-314b), and attribute values 316 (e.g., attribute value 316a-316b). Attribute values are sometimes herein called attributes, for ease of discussion. Furthermore, in some embodiments, an attribute, or attribute value, comprises both an attribute identifier (e.g., identifying a type of attribute) and a value (e.g., "color, red," where "color" is the attribute identifier, and "red" is the value). However, the present discussion is applicable without regard to the exact form or content of such attributes.

Each key/value pair in a leaf node is sometimes herein called an entry or tree entry 308 (e.g., tree entry 308a-308c). In some embodiments, keys are used to uniquely identify an entity, such as a data object or attribute, and thus the key in each tree entry 308 typically has a different value from the key in every other tree entry. Data object pointers 312 point to data objects 320 that may be stored within non-volatile memory (e.g., information in data object pointers 312 includes addresses to physical locations within the non-volatile memory). In some embodiments, attributes include source information, date information, or the like for particular data objects. A data object 320 may have any number of attributes associated with the data object.

Attribute values 316 are typically much smaller than their associated data objects. In some embodiments, when an attribute value meets (e.g., is smaller than) a predefined attribute size threshold, the attribute and its associated key are stored as a tree entry in a leaf node, and otherwise the attribute value is stored in a data node pointed to by a respective tree entry 308 in a leaf node. Similarly, in some embodiments, when a data object meets (e.g., is smaller than) a predefined object size threshold, the object and its key are stored as a tree entry in a leaf node. In FIG. 3, object pointer 312 would be replaced with the data object itself when the data object meets the predefined object size threshold.

As noted above, an attribute key 314 and its associated attribute value 316 (e.g., attribute one key 314a and attribute one value 316a) are called sometimes called a key/value pair 308. A data object key 310 and its associated data object pointer 312 also constitute a key/value pair. Individual key/value pairs 308 are typically stored contiguously within the leaf node into which they are placed. For example, data object key 310 and data object pointer 312 are stored as tree entry 308a, which occupies a contiguous portion or block 321 (contiguous portion 321a in this example) of a respective leaf node 306 (node 306-2 in this example). Similarly, tree entry 308b is stored in contiguous portion 321b of leaf node 306-3, and tree entry 308c is stored in contiguous portion 321c of leaf node 306-m.

In some embodiments, a logical to physical and physical to logical map (e.g., L2P and P2L address map 230-1, FIG. 2A) maps physical addresses in storage medium 132 to logical addresses (e.g., logical addresses used by a host computer system), and is stored at storage controller 124 or remote from storage controller 124. Physical to logical mapping 230-1 is typically indexed or keyed by physical addresses assigned to or associated with blocks of physical memory in storage medium 130, and maps physical addresses to corresponding logical addresses and optionally maps physical addresses to metadata values. In some embodiments, at least some of the metadata values for particular memory portions, at respective physical addresses, are stored in data structures separate from the physical to logical address map 230-1.

In some embodiments, serialization segment 322 is created and includes coalesced data objects and mapping information (e.g., B-tree nodes). In some embodiments, a serialization segment will accumulate data objects and mapping information in an alternating fashion until the serialization segment is full and the contents are written to one or more storage devices of the plurality of storage devices of the storage system in a single contiguous write. In some embodiments tree nodes in the serialization segment are a fixed size (e.g., 8 kB), while data objects in the serialization segment are not a fixed size.

Figure 4:
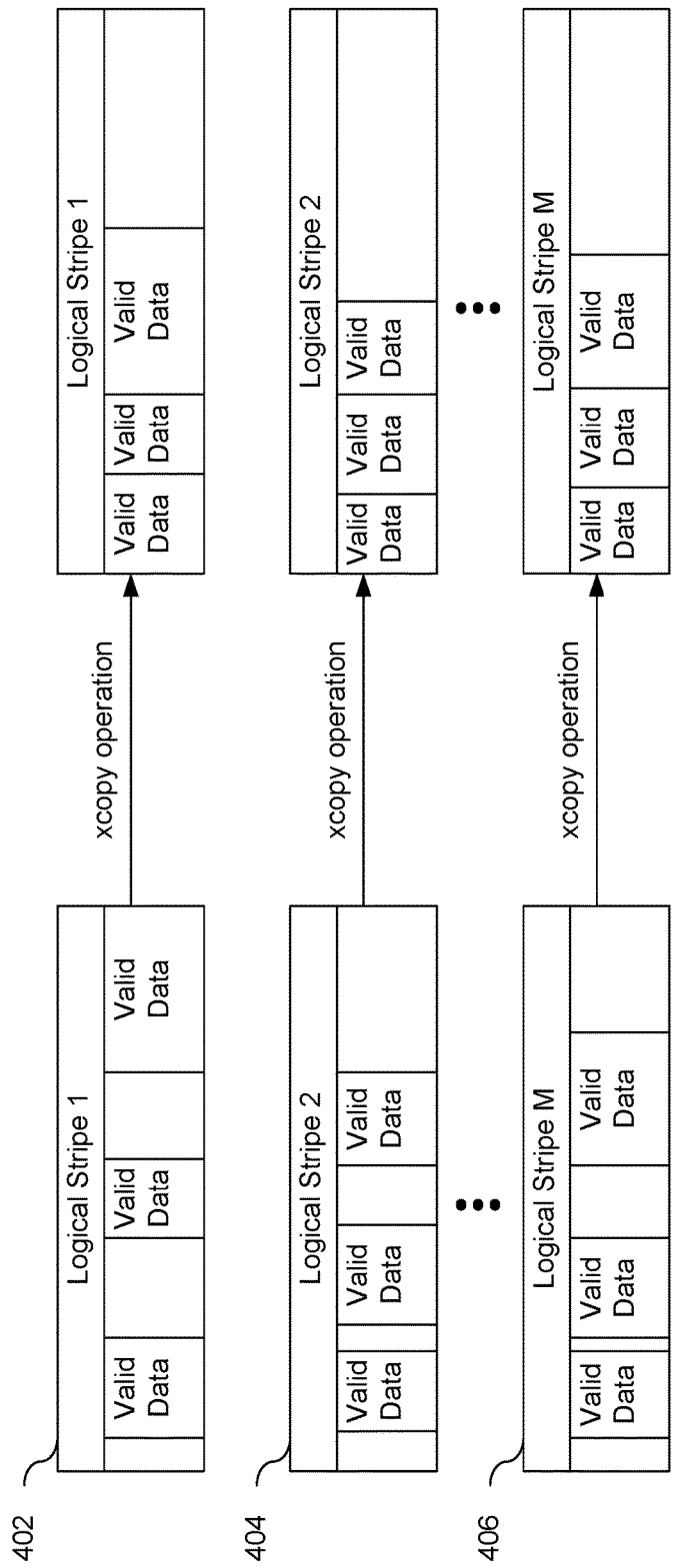
FIG. 4 is a diagram illustrating an internal copy operation (e.g., xcopy), in accordance with some embodiments.

FIG. 4 is a diagram illustrating use of an internal copy operation, internal to a storage system (e.g., an xcopy operation), in accordance with some embodiments. While FIG. 4 is described below as using an xcopy operation, it is to be understood that other types of internal copy operations (e.g., ODX), which copy data within a storage system without first sending the data to a host system, are used in other implementations.

FIG. 4 illustrates an example where M logical stripes 402, 404, 406, each contain some valid data but are not "full" (i.e., there are locations in each logical stripe that do not contain valid data). In some embodiments, the logical stripes were full at one time, but over time data in each logical stripe was invalidated due to ongoing processes (e.g., data updates, read disturb handling), and the logical stripes now have "holes" where valid data was previously located.

In some embodiments, in order to prepare each logical stripe for the host writing new data to it (e.g., a serialized write data operation that includes coalesced data objects and mapping information for a tiered data structure), valid data is coalesced in each logical stripe using an xcopy operation. For example, one or more xcopy commands are sent by computer system 110 to storage device 120, specifying data to be moved (i.e., copied) to new locations, thereby causing storage device 120 to perform the xcopy operation. In the example shown in FIG. 4, after the xcopy operation is performed, the valid data in each of the logical stripes, which previously had gaps between the different portions of valid data, is now located in a contiguous portion of the same logical stripe, and more specifically has been "repacked" to the beginning of each logical stripe (shown for illustrative purposes as the leftmost location in the logical stripe). Thus, as a result of the repacking, the valid data in the selected logical stripe is reassigned to a set of contiguous logical addresses in the logical stripe, typically to the logical addresses at the beginning (or end) of the logical stripe. As discussed next, the xcopy operation also causes the valid data to be moved to new physical locations. While FIG. 4 shows the valid data in each logical stripe being moved to a contiguous portion of the same logical stripe, in some implementations, the valid data in a logical stripe is moved to a contiguous portion of another logical stripe, leaving no valid data in the logical stripe from which the data was moved.

In some embodiments, in order to start an xcopy operation, the host sends an xcopy command (or more than one xcopy command), which is received by one or more of the storage devices (e.g., using receiving module 218-1 FIG. 2A). Typically, the xcopy command is of the form: xcopy (old_lba, n_blocks, new_lba, trim_flag). The xcopy command requests that the storage device copy the data in the "n_blocks" number of blocks starting at "old_lba" to a new location starting at "new_lba". The "trim_flag" parameter is used to determine if the old valid data is invalidated after being moved (i.e., if trim_flag=true old valid data is invalidated, if trim_flag=false old valid data is not invalidated). In some embodiments, the xcopy operation includes moving valid data from one physical location to another in one or more open erase blocks of the one or more storage devices. For example, a portion of valid data that is originally located in a selected closed erase block is moved to an open erase block during the xcopy operation.

In some embodiments, multiple xcopy commands are sent by the host to the storage device(s) in a vectored manner, as a single bundled request. For example, coalescing all the valid data in a logical stripe may require multiple xcopy commands, one for each contiguous set of valid data (i.e., valid data at a contiguous set of logical addresses) in the logical stripe, and those multiple xcopy commands are sent as a single bundled request.

In some embodiments, an xcopy operation is performed at the device-level and includes moving data in one storage device, between multiple storage devices, or both. As such, an xcopy operation allows the process of compacting residual valid data in a logical stripe to be done by a host issuing xcopy commands to one or more storage devices to move data within the devices (e.g., using compacting module 226-1, FIG. 2A). Thus, use of the xcopy operation allows coalescing and repacking (compacting) to be performed without valid data being read back to the host and then re-written, and, as a result, lessens traffic on the communication buses between the host and storage devices (e.g., data connections 101, FIG. 1). Once the coalescing and repacking is complete, the space corresponding to the source of the residual valid data is typically "trimmed" (i.e., invalidated) so that the storage space formerly occupied by the residual valid data is free to be erased and then written to.

In some embodiments, use of the above described xcopy operation allows the host to perform host-based garbage collection that reduces the amount of device-level garbage collection required and thus reduces write amplification. For example, if the logical stripes of a storage system are aligned with device-level erase blocks (i.e., the logical stripe is sized such that it is composed of one or more erase blocks per storage device), the trimming in the compaction process results in empty or near-empty erase blocks within the storage devices, and thus little to no device-level garbage collection is required.

In some embodiments, host-based garbage collection is further optimized by additional device-level commands to more tightly control the formation of erase blocks within the storage device. For example, in some embodiments, a device-level command is included to allow the device to support the writing of entire erase blocks in a single operation. Additionally, in some embodiments, a device-level command is included to provide capability for determining the size of a erase block for the storage device.

Since the host-based compaction process effectively performs garbage collection in the storage devices, the amount of garbage collection activity that is performed within the device is significantly reduced. Furthermore, by overriding device-level garbage collection, the host can use a more sophisticated garbage collection algorithm than the storage devices are capable of using, thereby yielding lower write amplification and higher performance. However, even when most of the garbage collection activity is performed by the host, in some embodiments, limited device-level garbage collection is still performed to deal with low level device activities (such as handling read disturbs, enforcing data retention limits, and bad block removal), thus simplifying host-based garbage collection.

An additional benefit of host-based garbage collection using xcopy operations is that the host has explicit control over the majority of data copying within the device. The host can therefore schedule xcopy operations to minimize their interaction with (i.e., competition for storage device resources) read operations, to get more consistent read latencies. In some embodiments, for maximum latency stability, the xcopy command is supplemented with a command to explicitly control when the storage devices initiate block erase operations.

Figure 5:
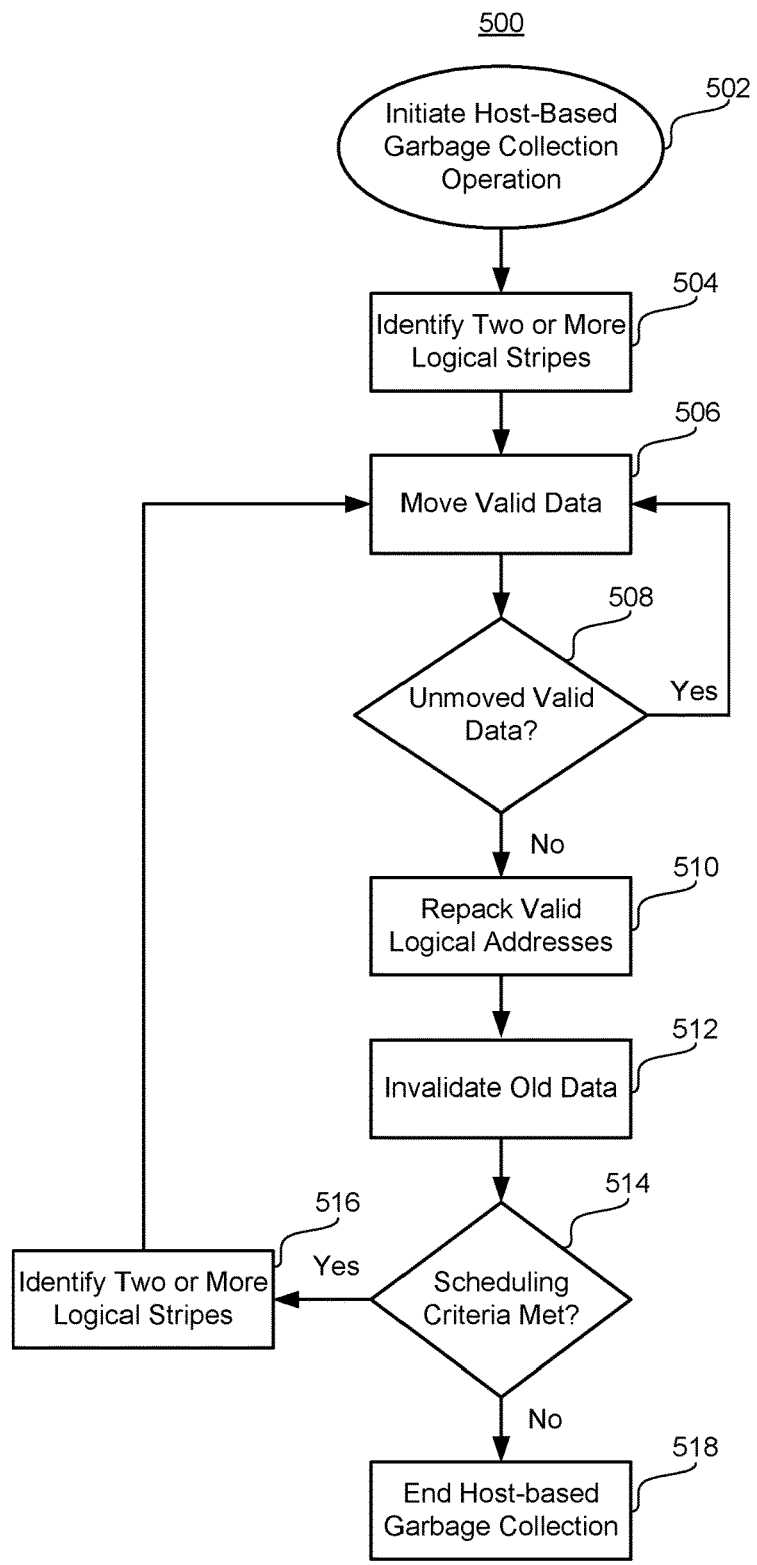
FIG. 5 is a conceptual flowchart of a host-based garbage collection operation, in accordance with some embodiments.
Figure 6A:
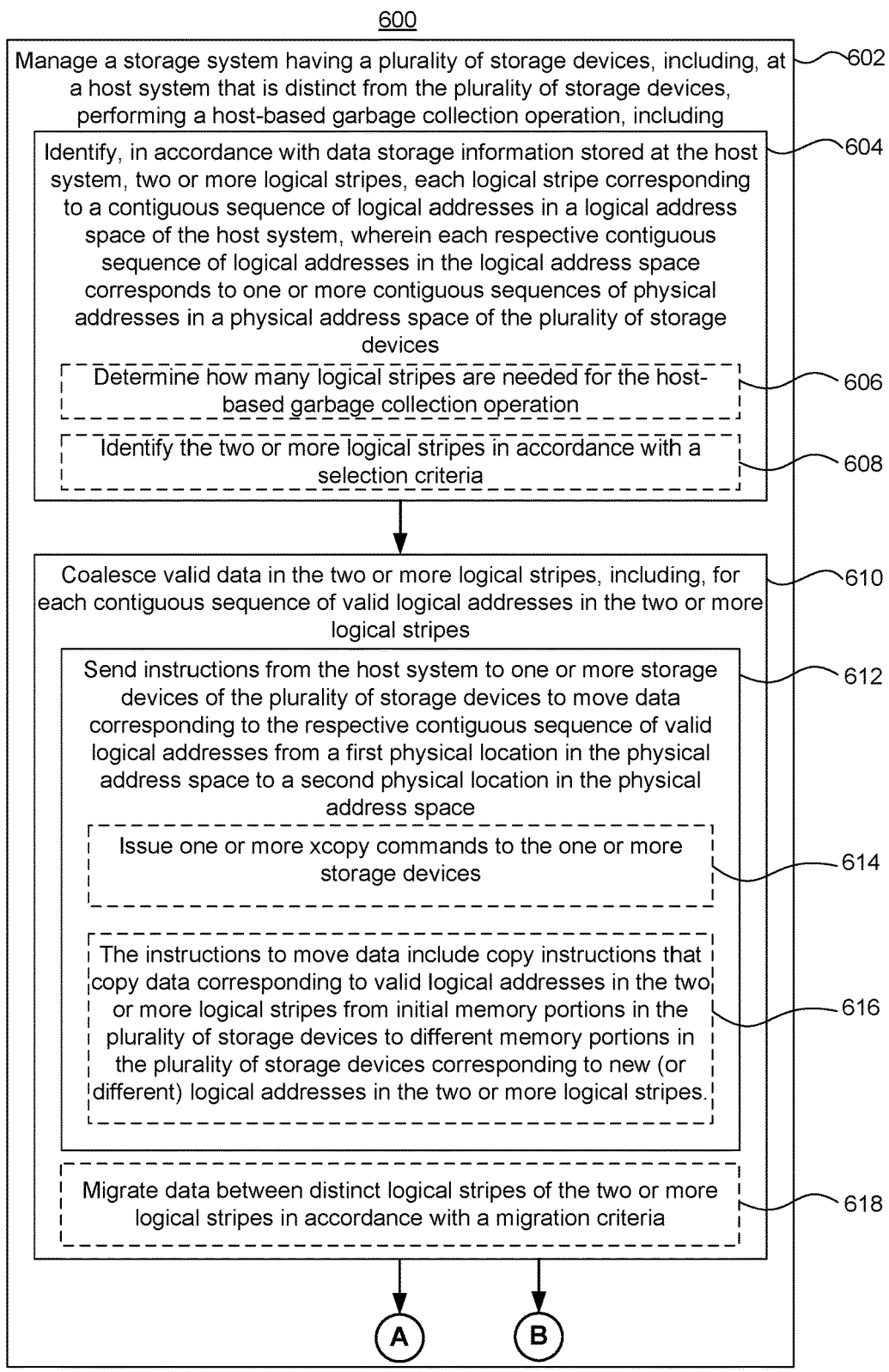
FIGS. 6A-6D illustrate a flowchart representation of a method of managing a storage system, in accordance with some embodiments In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.
Figure 6B:
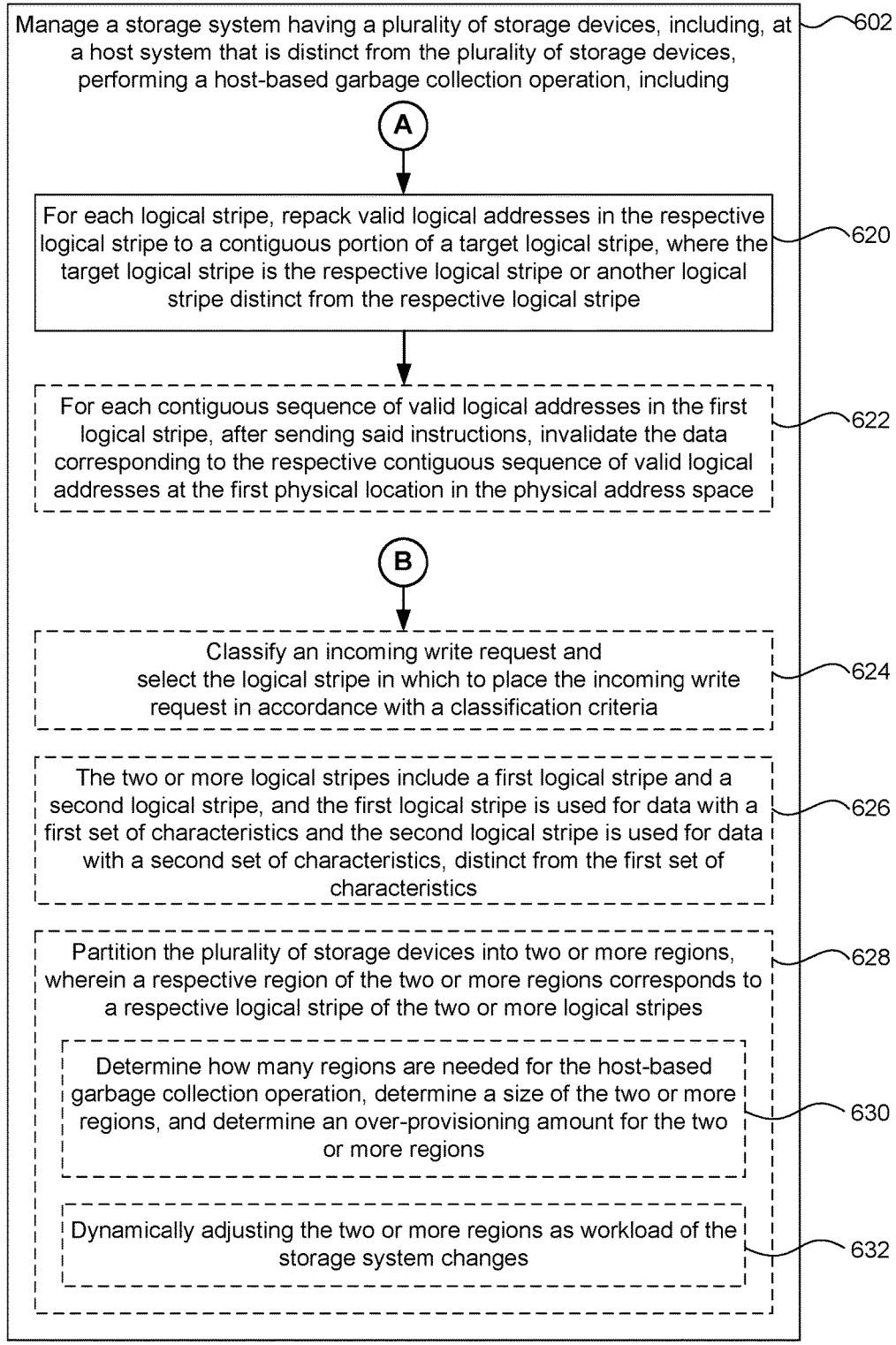
Figure 6C:
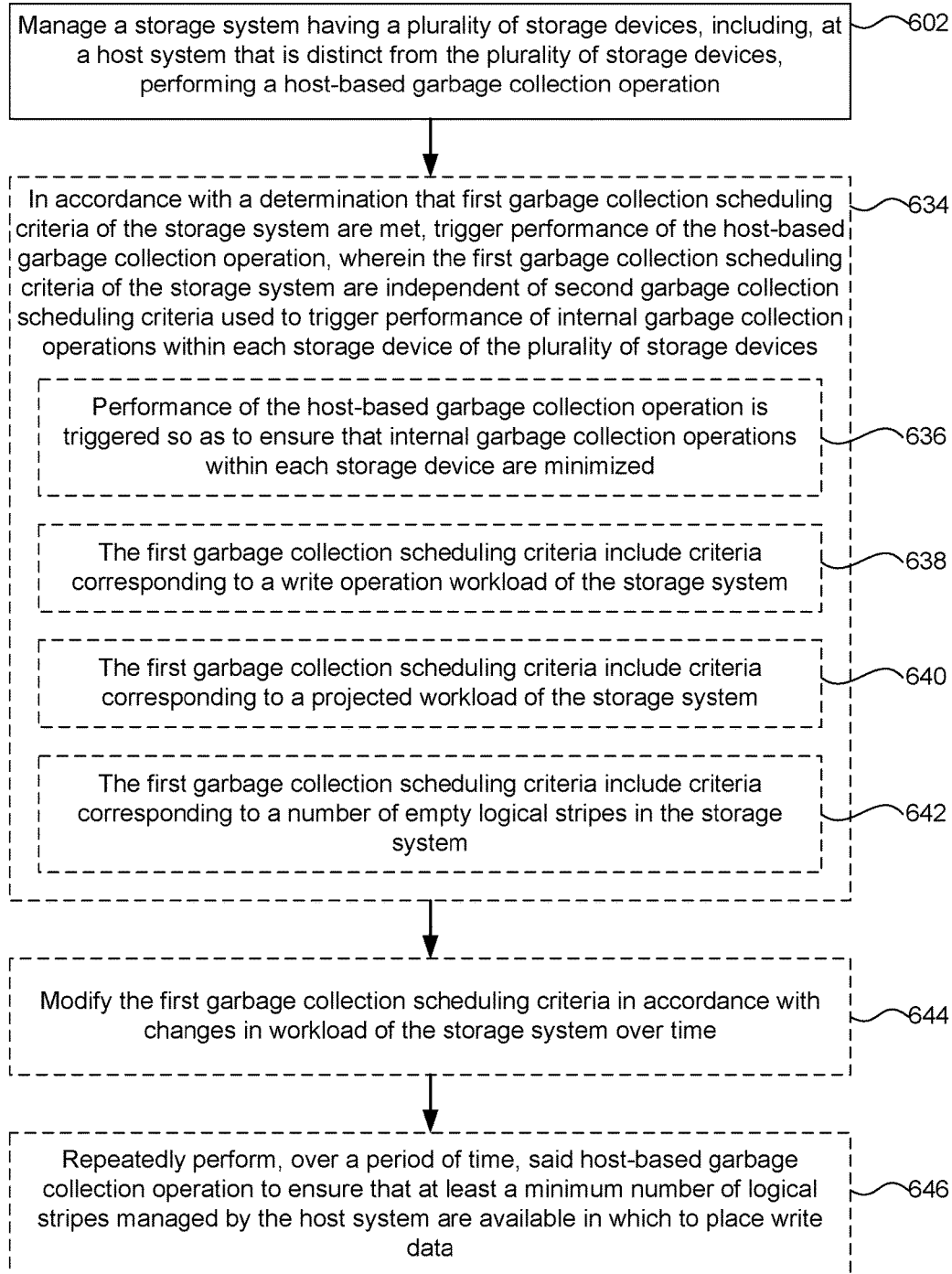
Figure 6D:
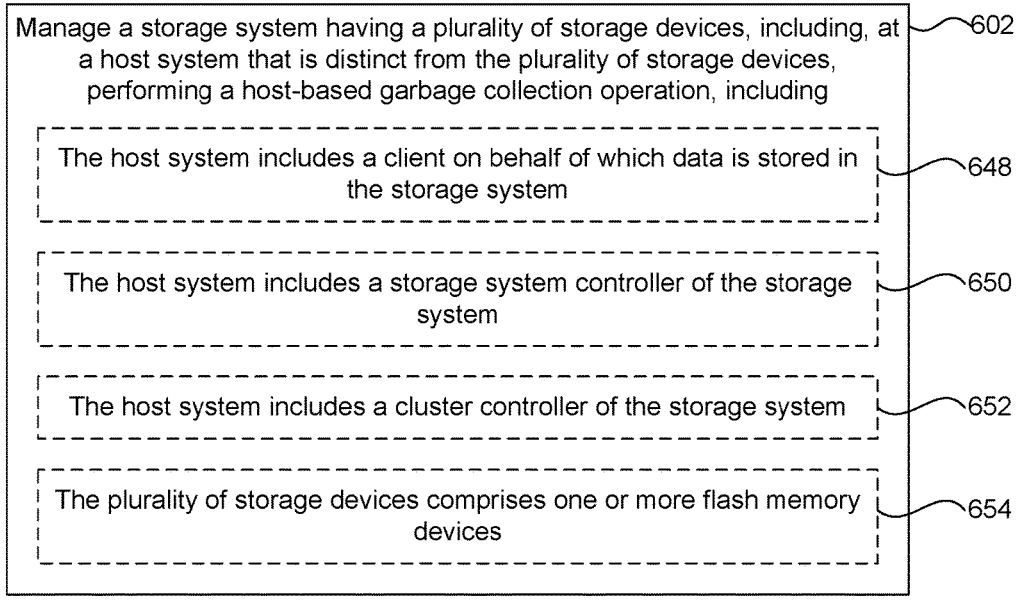

FIG. 5 illustrates a conceptual flowchart of a host-based garbage collection operation, in accordance with some embodiments. More specifically, FIG. 5 illustrates a conceptual flow chart representation of a host-based garbage collection operation performed within a data storage system (e.g., data storage system 100, FIG. 1) having a tiered data structure (e.g., tiered data structure 300, FIG. 3), in accordance with some embodiments.

With the addition of relatively simple extra device-level operations (e.g., the xcopy operation described above with reference to FIG. 4), a host server can efficiently orchestrate garbage collection within a storage device and achieve lower write amplification (and better performance) than relying on device-level garbage collection. This is particularly useful when host-based garbage collection is used to facilitate serialized flash writes. Write serialization can be used to reduce the number of I/O's required for small writes in software RAID implementations (e.g., RAID5 and RAID6). Write serialization can also be used to improve the performance of B-trees (e.g., tiered data structure 300, FIG. 3) or other paged mapping structures. While using write serialization in conjunction with host-based garbage collection to reclaim contiguous regions of free space, relatively little extra effort is required to use garbage collection strategies that minimizes write amplification for a broad class of workloads.

With reference to the data storage system 100 depicted in FIG. 1, in some embodiments, method 500 is performed at a computer system (e.g., computer system 110). In some embodiments, method 500 is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 500 are performed by executable software (e.g., device driver 216) that exists within a non-transitory computer-readable storage medium, such as memory 206-1 (FIG. 2A).

In some embodiments, some of the operations (or alternatively, steps) of method 500 are performed by a storage device (e.g., storage device 120), or one or more components of the storage device (e.g., storage controller 124), that is operatively coupled with the storage device and other operations of method 500 are performed at the host system. In some of these embodiments, the method 500 is governed, at least in part, by instructions that are stored in a non-transitory computer-readable storage medium and that are executed by one or more processors of a device, such as the one or more processing units (CPUs) 122 of management module 121 (FIG. 2B).

For ease of explanation, the following describes method 500 as performed by the host system (e.g., by CPUs 202 and device driver 216 of computer system 110, FIG. 2A). With reference to FIG. 2A, in some embodiments, the operations of method 500 are performed, at least in part, by a receiving module (e.g., receiving module 218-1); a write module (e.g., write module 220-1); and within the write module, a serializing module (e.g., serializing module 222-1); a garbage collection module (e.g., garbage collection module 224-1); and within the garbage collection module, a compacting module (e.g., compacting module 226-1). Optionally, some of the operations of method 500 are performed by a tiered data structure access module (e.g., tiered data access module 234-1); and within the tiered data structure access module, an access module (e.g., access module 236-1), and a secondary mapping table (e.g., secondary mapping table 238-1); a cache (e.g., cache 240-1); and within the cache, a cache lookup table (e.g., cache lookup table 242-1), and cached portions of tiered data structure (e.g., cached portions of tiered data structure 244-1).

Method 500 begins, in some embodiments, when the host system (e.g., computer system 110, FIG. 1, or a component thereof, such as device driver 216, FIG. 2A) initiates 502 a host-based garbage collection operation. In some embodiments, the host-based garbage collection operation begins by identifying 504 two or more logical stripes, each which corresponds to a contiguous sequence of logical addresses in a logical address space, in accordance with data storage information stored at the host system. In some embodiments, identifying 504 the two or more logical stripe includes identifying the two or more logical stripes in accordance with a selection criteria. For example, in some embodiments, identifying the two or more logical stripes in accordance with a selection criteria includes identifying a first logical stripe in accordance with a first selection criteria and identifying a second logical stripe in accordance with a second selection criteria. In some embodiments, the first and/or second selection criteria include selecting a respective stripe that is least full in a plurality of stripes in the logical address space. In some embodiments, the first and/or second selection criteria include selecting a stripe in accordance with an algorithm based on the particular garbage collection scheme of the host-based garbage collection operation. An example garbage collection scheme is one that uses a "greedy" garbage collection policy, in which erase blocks with the least amount of valid data are selected for garbage collection. However, greedy garbage collection algorithms exhibit high write amplification for some workloads (e.g., workloads with write skew), and it is beneficial that the host is able to select a different garbage collection scheme that is optimized for the type of workload. Examples of garbage collection schemes other than the greedy garbage collection scheme include: first-in-first-out (FIFO), also known as least-recently-used (LRU); and various algorithms described in the academic literature, including Window-Greedy, eNVy, Dynamic Age Clustering, ContainerMarking and Frequency-based Data Placement.

In some embodiments, the particular garbage collection algorithm determines how many logical stripes are required for grouping data. For example, in one embodiment two logical stripes are required to group hot data in a first logical stripe and to group cold data in a second logical stripe. In other embodiments, more than two logical stripes are required to group hot data in a first logical stripe, cold data in a second logical stripe, and data that is in between hot and cold in a number of other logical stripes. In some embodiments, the number of logical stripes used depends on the workload.

In some embodiments, the particular garbage collection algorithm includes an algorithm for partitioning (e.g., implemented by partitioning module 228-1, FIG. 2A) a plurality of storage devices (e.g., two or more of storage device 120) into two or more regions. In some embodiments, a respective region of the two or more regions corresponds to a respective logical stripe of the two or more logical stripes. For example, with reference to FIG. 4, one partitioned region of a plurality of storage devices corresponds to logical stripe 1, 402, and one partitioned region of a plurality of storage devices corresponds to logical stripe 2, 404. In some embodiments, one logical stripe corresponds to one region. Further, in some embodiments, the number of regions is equal to the number of logical stripes. For example, if M logical stripes exist (as shown in FIG. 4), the plurality of storage devices is partitioned to have M regions. Additionally, in some embodiments, the partitioning algorithm determines the required number of regions, the size of each region, and the over-provisioning of each region.

With respect to over-provisioning for each region, the expected usage pattern for the region has an impact on the expected write-amplification. For example, write amplification is dependent on the average emptiness of blocks selected for garbage collection. Write amplification is also dependent on the amount of over-provisioning for the region. As a result, in some embodiments a smaller amount of over-provisioning (e.g., quantity of over-provisioning per Gigabyte of storage in the region) is allocated to one or more regions (e.g., the region for cold data) than one or more other regions (e.g., the region for hot data). However, both the amount of over-provisioning allocated to a region and the usage pattern for the region have an impact on the expected level of write-amplification for that region. In some embodiments, the available over-provisioning in the storage system is allocated between the regions so that the predicted overall write-amplification for the system is minimized, taking into account both over-provisioning and predicted usage patterns.

In some embodiments, the partitioning algorithm will dynamically adjust the two or more regions as the workload of the storage system changes. For example, in some embodiments, the number of regions is adjusted to better match the current workload of the storage system. In some embodiments, the regions are adjusted based on the type of data being stored, or the type of data that is targeted for a certain region (e.g., a region that previously contained hot data is targeted to now contain cold data). In this way write traffic is evenly distributed to the regions, so that their write density ratios (e.g., for each region, the amount of data written to the region divided by the size of the region), are approximately equal within a predefined margin (e.g., 10 percent or 20 percent).

Method 500 continues by moving 506 valid data located in the identified logical stripes. Generally, portions of valid data will be spread out in each identified logical stripe with gaps between the portions of valid data, as described above with reference to FIG. 4. In order to prepare each logical stripe for a data write operation, the valid data in that logical stripe is moved to the start of logical stripe using an xcopy operation. In some embodiments, after each portion of valid data in the logical stripe is moved, the method determines 508 if there is any more unmoved valid data in the logical stripe. In some embodiments, if there is unmoved valid data in the logical stripe (i.e., 508—"yes"), unmoved valid data will be moved 506 as described above. Alternately, if it is determined that there is no unmoved valid data (i.e., 508—"no"), the method continues by repacking 510 valid logical addresses (i.e., logical addresses at which valid data is stored) to the beginning of the identified logical stripe.

In some embodiments, method 500 continues by invalidating 512 old data. As described above with reference to FIG. 4, an xcopy command generally includes a trim flag, and if the "trim_flag" is true, the old copy of the valid data (i.e., at the storage locations occupied by the valid data immediately prior to the moving of the valid data using xcopy command(s)) is invalidated, and all of the contiguous physical device space in which the original portion was written will become free. With sufficiently large segments, the host will free sufficiently large contiguous regions of physical space that minimal garbage collection is required within the device. Thus, the host-based garbage collection ensures that an empty erase block is almost always available for erasure and reuse, which means minimal garbage collection is required within the storage device and device-level garbage collection is effectively overridden by the host-based garbage collection.

In some embodiments, method 500 continues by determining if a garbage collection scheduling criteria is met 514. If the garbage collection scheduling criteria is met (i.e., 514—"yes"), another host-based garbage collection is triggered, and a different set of two or more logical stripes are identified 516 in the same manner as explained above with reference to operation 504. Following the identification of another logical stripe, the remainder of the host-based garbage collection operation (i.e., steps 506-512) occurs with respect to the newly identified logical stripes. As the host-based garbage collection operations are performed independently of and effectively replace device-level garbage collection, the scheduling criteria in operation 514 is typically independent of garbage collection scheduling criteria used to trigger performance of internal garbage collection operations within each storage device of the plurality of storage devices. For example, garbage collection scheduling criteria used to trigger performance of internal garbage collection operations are typically related to low level device activities such as handling read disturbs, enforcing data retention limits, and bad block removal, while host-based garbage collection scheduling criteria are generally related to providing free space for anticipated serialized writes.

In some embodiments of method 500, if the garbage collection scheduling criteria is not met (i.e., 514—"no"), the host-based garbage collection operations are completed and end 518. In some embodiments, this results in the system waiting for another condition to occur that requires a new host-based garbage collection operation to be initiated, at which time method 500 begins again.

In some embodiments, the garbage collection scheduling criteria of operation 514 include criteria corresponding to a write operation workload of the storage system. Additionally, in some embodiments, the garbage collection scheduling criteria of operation 514 include criteria corresponding to a projected workload of the storage system. For example, in some embodiments, the projected workload is a predominantly random update workload composed of single page updates (e.g., single page updates, the large majority (e.g., at least 75%) of which are not writes or updates to sequential locations, or which have no discernable pattern or correlation to each other). In another example, the projected workload is a 2-modal workload in which pages are defined as being for either hot or cold data. In yet another example, the projected workload is a k-modal workload, where a k-modal workload is one in which "k" distinct subsets of the flash block address space receive distinct fractions of write traffic.

In some embodiments, the garbage collection scheduling criteria of operation 514 include criteria corresponding to a number of empty logical stripes in the storage system. Typically the number of empty logical stripes in the storage system used for the scheduling criteria is a target number that is needed to support write serialization. For example, in order to group incoming serialized writes based on predicted lifetime characteristics, some write serialization schemes utilize multiple write serialization segments, each corresponding to a different predicted lifetime of the data to be written. In these cases, the garbage collection scheduling criteria corresponds to the number of empty logical stripes required (i.e., typically one empty logical stripe is required per write serialization segment).

In some embodiments, the garbage collection scheduling criteria of operation 514 is modified in accordance with changes in workload of the storage system over time. For example, different scheduling criteria are used for different usage/workload patterns, such as a predominantly random write pattern of usage, or a predominantly sequential write pattern of usage. Some examples of different scheduling criteria used for different usage/workload patterns are as follows. Under a light workload, a high/low watermark scheme could be used in which a pool of empty erase blocks is replenished via garbage collection only when the size of pool falls below a low-water mark. The garbage collector stops once the high-water mark is reached. On the other hand, under a heavy workload, the garbage collector could be scheduled to generate a new free segment every time the current write segment is filled. In yet another example, for workloads with short bursts interspersed with periods of low activity, garbage collection could be suspended during the bursts to minimize write and read latencies. Garbage collection would run during low activity periods to replenish the free segment pool to a sufficient level to handle the amount of buffering required during the bursts.

Overall, the garbage collection scheduler needs to generate fresh write segments at the same rate that new data is written to the device, plus the extra writes generated via garbage collection itself. This overall rate is determined by the write amplification of the workload, which can vary over time. In some embodiments, the garbage collector schedules itself using a rolling estimate of the overall write rate (including write amplification). As the write rate and/or write-amplification grows, it generates new segments more aggressively. As the write rate and/or write-amplification decreases, it generates new segments more slowly.

Use of a host-based garbage collection operation allows the current workload of the storage system to be identified and the scheduling criteria to be modified accordingly. For example, during the day (e.g., when the storage system has one usage/workload pattern), one scheduling criteria is used, and during the night (e.g., when the storage system has a different usage/workload pattern), a different scheduling criteria is used.

Additional details concerning each of the processing steps for method 400, as well as details concerning additional processing steps, are presented below with reference to FIGS. 6A-6D.

FIGS. 6A-6D illustrate a flowchart representation of a method of managing a data storage system, in accordance with some embodiments. With reference to the data storage system 100 depicted in FIG. 1, in some embodiments, a method 600 is performed at a computer system (e.g., computer system 110). In some embodiments, method 600 is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 600 are performed by executing software (e.g., device driver 216) stored in a non-transitory computer-readable storage medium, such as memory 206-1 (FIG. 2A).

In some embodiments, some of the operations (or alternatively, steps) of method 600 are performed by a storage device (e.g., storage device 120), or one or more components of the storage device (e.g., storage controller 124), that is operatively coupled with the storage device and other operations of method 600 are performed at the host system. In some of these embodiments, method 600 is governed, at least in part, by instructions stored in a non-transitory computer-readable storage medium and that are executed by one or more processors of a device, such as the one or more processing units (CPUs) 122 of management module 121 (FIG. 2B).

For ease of explanation, the following describes method 600 as performed by the host system (e.g., by CPUs 202 and device driver 216 of computer system 110, FIG. 2A). With reference to FIG. 2A, in some embodiments, the operations of method 600 are performed, at least in part, by a receiving module (e.g., receiving module 218-1); a write module (e.g., write module 220-1); and within the write module, a serializing module (e.g., serializing module 222-1); a garbage collection module (e.g., garbage collection module 224-1); and within the garbage collection module, a compacting module (e.g., compacting module 226-1). Optionally, some of the operations of method 600 are performed by a tiered data structure access module (e.g., tiered data access module 234-1); and within the tiered data structure access module, an access module (e.g., access module 236-1), and a secondary mapping table (e.g., secondary mapping table 238-1); a cache (e.g., cache 240-1); and within the cache, a cache lookup table (e.g., cache lookup table 242-1), and cached portions of tiered data structure (e.g., cached portions of tiered data structure 244-1).

With reference to FIGS. 6A-6D, the host system (e.g., computer system 110, or a component thereof, such as device driver 216, FIG. 2A) manages 602 a storage system (e.g., data storage system 100, FIG. 1) having a plurality of storage devices (e.g., NVM devices 134 in storage device 120, FIG. 1), including, at a host system that is distinct from the plurality of storage devices, performing a host-based garbage collection operation. Method 600 includes identifying 604, in accordance with data storage information stored at the host system, two or more logical stripes, each logical stripe corresponding to a contiguous sequence of logical addresses in a logical address space of the host system. In many circumstances, the contiguous sequence of logical addresses for the logical stripe corresponds to a contiguous sequence of physical addresses in a physical address space of the storage devices. However, for the reasons discussed next, more generally, the contiguous sequence of logical addresses for the logical stripe corresponds to one or more contiguous sequences of physical addresses in the physical address space of the storage devices.

However, in some circumstances, the writing of a logical stripe may be interrupted or interspersed with writes due to internal garbage collection events (e.g., garbage collection events caused by read disturbs reaching a threshold level, wear leveling, bad block replacement, etc.), in which case the contiguous sequence of logical addresses for the logical stripe will correspond to two or more contiguous sequences of physical addresses in the physical address space of the storage devices. Nevertheless, since such internal garbage collection events typically occur only rarely. For example, in some embodiments, the writing of a logical stripe by a host-based garbage collection operation is interrupted by an internal garbage collection operation less than 10 percent of the time, and in some embodiments, less than 1 percent of the time.

In addition, if the size of a logical stripe is such that its data must be stored in two or more blocks, those two or more blocks may not have neighboring sequences of physical addresses. Also, even if the size of a logical stripe matches that of a block, or a portion of a block, the starting position or offset of a logical stripe within the physical address space may result in the data in the logical stripe being store in two blocks, and those two blocks need not have neighboring sequences of physical addresses. Therefore, in general, the contiguous sequence of logical addresses for each logical stripe corresponds to one or more contiguous sequences of physical addresses in the physical address space of the storage devices.

In some embodiments, method 600 includes determining 606 how many logical stripes are needed for the host-based garbage collection operation, as explained above with reference to FIG. 5 (504). In some embodiments, method 600 includes identifying 608 the two or more logical stripes in accordance with a selection criteria, as explained above with reference to FIG. 5 (504).

In some embodiments, method 600 continues by coalescing 610 valid data in the two or more logical stripes. Further, in some embodiments, for each contiguous sequence of valid logical addresses (i.e., logical addresses at which valid data is stored) in the two or more logical stripes, the host system sends 612 instructions to one or more storage devices of the plurality of storage devices to move data corresponding to the respective contiguous sequence of valid logical addresses from a first physical location in the physical address space to a second physical location in the physical address space. In some embodiments, the first physical location is an initial location of the data prior to the one or more xcopy commands and the second physical location is a new location in one or more open erase blocks of the one or more storage devices, as explained in more detail above with reference to FIG. 4. Additionally, in some embodiments, the instructions to move data include 616 copy instructions that copy data corresponding to valid logical addresses in the two or more logical stripes from initial memory portions in the plurality of storage devices to different memory portions in the plurality of storage devices corresponding to new (or different) logical addresses in the two or more logical stripes.

In some embodiments, the instructions sent from the host system in operation 612 include 614 one or more xcopy commands to the one or more storage devices. Alternatively, the instructions sent from the host system in operation 612 include one or more internal copy commands to the one or more storage devices, which instruct the copying of data within the storage system without sending the copied data to the host system.

In some embodiments, method 600 continues by migrating 618 data between distinct logical stripes of the two or more logical stripes in accordance with a migration criteria. One example migration criteria is based on a heuristic analysis of the data's history and causes data to be migrated to hotter or colder regions accordingly. Furthermore, in some embodiments, migration is typically done during the garbage collection compaction operations (as explained above with reference to FIG. 4), in which data is copied to a new location, and thus data migration is accomplished without additional data movement operations.

In some embodiments, method 600 continues by repacking 620 valid logical addresses (i.e., logical addresses at which valid data is stored) in each respective logical stripe, of the two or more logical stripes, to a contiguous portion (e.g., at the beginning) of a target logical stripe, where the target logical stripe is the respective logical stripe or another logical stripe distinct from the respective logical stripe, as explained above with reference to FIG. 4.

In some embodiments, method 600 continues, after sending 612 instructions to move data, by, for each contiguous sequence of valid logical addresses (i.e., logical addresses at which valid data is stored) in the first logical stripe, invalidating 622 the data corresponding to the respective contiguous sequence of valid logical addresses at the first physical location in the physical address space, as explained above with reference to FIG. 5 (512). Further, in some embodiments, after sending said instructions, method 600 continues by classifying 624 an incoming write request and selecting the logical stripe in which to place the incoming write request in accordance with one or more classification criteria. In some embodiments, the classification criteria include explicit classification using hints (e.g., hot/cold classification or other data characteristics). In some embodiments, the classification criteria are based on past history of write accesses.

In some embodiments of method 600, the two or more logical stripes include 626 a first logical stripe and a second logical stripe, and the first logical stripe is used for data with a first set of characteristics and the second logical stripe is used for data with a second set of characteristics, distinct from the first set of characteristics. For example, the first logical stripe is used for hot data and the second logical stripe is used for cold data. Although for simplicity, the examples will use 2 logical stripes, in some embodiments, the host system uses more than 2 logical stripes to group data based on predicted (or hinted) lifetime characteristics.

In some embodiments, method 600 continues by partitioning 628 (e.g., using partitioning module 228-1, FIG. 2A) the plurality of storage devices into two or more regions, wherein a respective region of the two or more regions corresponds to a respective logical stripe of the two or more logical stripes, as explained above with reference to FIG. 5 (504). Further, in some embodiments, partitioning 628 the plurality of storage devices includes: determining 630 how many regions are needed for the host-based garbage collection operation, determining a size of the two or more regions, and determining an over-provisioning amount for the two or more regions, as explained above with reference to FIG. 5 (504). Additionally, in some embodiments, method 600 includes dynamically adjusting 632 the two or more regions as workload of the storage system changes, as explained above with reference to FIG. 5 (504).

In some embodiments, method 600 further includes, in accordance with a determination that first garbage collection scheduling criteria of the storage system are met, triggering 634 performance of the host-based garbage collection operation, wherein the first garbage collection scheduling criteria of the storage system are independent of second garbage collection scheduling criteria used to trigger performance of internal garbage collection operations within each storage device of the plurality of storage devices. In some embodiments, performance of the host-based garbage collection operation is triggered 636 so as to ensure that internal garbage collection operations within each storage device are minimized. In some embodiments, the first garbage collection scheduling criteria of operation 634 includes 638 criteria corresponding to a write operation workload of the storage system. For example, as measurements of the write operation workload increase, or pass one or more predefined thresholds, additional garbage collection operations are scheduled, even if garbage collection operations might not yet be scheduled solely on the basis of the number of empty logical stripes in the storage system.

In some embodiments, the first garbage collection scheduling criteria includes 640 criteria corresponding to a projected workload of the storage system. For example, the method may include determining an upward or downward trend in the workload, and using the determined workload trend that to determine a projected workload of the storage system. Alternatively, or in addition, the system may determine a project workload based on historical data, such as historical data indicating periods of time during which workloads are typically higher or lower than an average workload of the system. Further, in some embodiments, the first garbage collection criteria include one or more criteria with respect to the projected workload.

Furthermore, in some embodiments, the first garbage collection scheduling criteria includes 642 criteria corresponding to a number of empty logical stripes in the storage system. For example, the criteria may include one or more thresholds (e.g., a preferred level and a minimum level) for the number of empty logical stripes, and when the number of empty logical stripes in the storage system approaches, reaches or falls below each of those thresholds, that has a corresponding impact on the scheduling of host-based garbage collection operations.

In some embodiments, method 600 further includes modifying 644 the first garbage collection scheduling criteria in accordance with changes in workload of the storage system over time, as explained above with reference to FIG. 5 (514).

In some embodiments, method 600 further includes repeatedly performing 646, over a period of time, the host-based garbage collection operation of step 602 to ensure that at least a minimum number of logical stripes managed by the host system are available in which to place write data, as explained above with reference to FIG. 5 (504). Further, in some embodiments, after performing the host-based garbage collection operation of step 602, the host sends write data to one or more of the plurality of storage devices (e.g., using write module 220-1, FIG. 2A) to store data assigned to logical addresses in an identified logical stripe. In some embodiments, sending write data is performed as a serialized write (e.g., using serializing module 222-1, FIG. 2A) and fills in open space in the logical stripe that was freed by the host-based garbage collection operation. Further, because the xcopy operation was used to move valid data in the logical stripe, the existing valid data does not need to be resent from the host to the storage device, as explained above with reference to FIG. 4.

In some embodiments, the host system includes 648 a client on behalf of which data is stored in the storage system (e.g., data storage system 100, FIG. 1). In some embodiments, the client is or includes an entity on behalf of which data is stored in the storage system. For example, in some embodiments, the host is computer system 110 (FIG. 1) or a client process, module or application executed by computer system 110.

In some embodiments, the host system includes 650 a storage system controller of the storage system. In some embodiments, the storage system controller controls and/or coordinates operations among one or more storage devices (e.g., data storage device 120, FIG. 1). In some embodiments, the storage system controller is an entity with processing power closest to the storage device. For example, in some embodiments, in some storage systems, the host is an intermediary node between one or more storage devices and a client.

In some embodiments, the host system includes 652 a cluster controller of the storage system. In some embodiments, the cluster controller controls and/or coordinates operations among one or more data storage subsystems, where each of the data storage subsystems may be implemented as a data storage system having one or more storage devices (e.g., data storage device 120, FIG. 1). In some embodiments, the cluster controller is an entity with processing power between a client system and the storage device. Further, in some embodiments, the storage device includes 654 one or more flash memory devices.

With respect to storage medium 132 (FIG. 1), it is noted that semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible (e.g., a NOR memory array). One of skill in the art will recognize that the NAND and NOR memory configurations are exemplary, and memory elements may be otherwise configured.

The semiconductor memory elements included in a single device, such as memory elements located within and/or over the same substrate or in a single die, may be distributed in a two- or three-dimensional manner (such as a two dimensional (2D) memory array structure or a three dimensional (3D) memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration (e.g., in an x-z plane), thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned wherein some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions described and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first target charge could be termed a second target charge, and, similarly, a second target charge could be termed a first target charge, without changing the meaning of the description, so long as all occurrences of the "first target charge" are renamed consistently and all occurrences of the "second target charge" are renamed consistently. The first target charge and the second target charge are both target charges, but they are not the same target charge.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system having a plurality of storage devices, the method comprising:
   at a host system that is distinct from the plurality of storage devices, performing a host-based garbage collection operation, comprising:
      identifying, in accordance with data storage information stored at the host system, one or more logical stripes, wherein
         each logical stripe of the one or more logical stripes is a distinct contiguous sequence of logical addresses in a logical address space of the host system,
         each logical stripe includes two or more contiguous sequences of valid logical addresses, which are separated from each other by one or more gaps,
         a size of each logical stripe is a same predetermined size, and
         logical addresses for each logical stripe in the logical address space of the host system are mapped to physical addresses in a physical address space of the plurality of storage devices by mapping information in the plurality of storage devices; and
      in accordance with the identifying, for each logical stripe of the one or more logical stripes, coalescing valid data, including:
         for at least one contiguous sequence of valid logical addresses of the group of two or more contiguous sequences of valid logical addresses, in a logical stripe in the logical address space of the host system, sending instructions from the host system to one or more storage devices of the plurality of storage devices to move valid data corresponding to a first contiguous sequence of valid logical addresses from a first physical location in the physical address space to a second physical location in the physical address space; and for each respective logical stripe of the one or more logical stripes, repacking the two or more contiguous sequences of valid logical addresses, in the respective logical stripe in the logical address space of the host system, to a single contiguous set of logical addresses in a contiguous portion of a corresponding target logical stripe, in the logical address space of the host system, the corresponding target logical stripe comprising the respective logical stripe or another logical stripe distinct from the respective logical stripe, wherein the other logical stripe is a second contiguous sequence of logical addresses in the logical address space of the host system distinct from the first contiguous sequence of logical addresses in the logical address space of the host system.

2. The method of claim 1, wherein identifying the one or more logical stripes, in the logical address space of the host system, includes determining how many logical stripes are needed for the host-based garbage collection operation.

3. The method of claim 1, wherein identifying the one or more logical stripes, in the logical address space of the host system, includes identifying the one or more logical stripes in accordance with selection criteria.

4. The method of claim 1, including:
partitioning the plurality of storage devices into two or more regions, wherein a respective region of the two or more regions corresponds to a respective logical stripe of the one or more logical stripes, in the logical address space of the host system.

5. The method of claim 4, wherein partitioning the plurality of storage devices includes:
determining how many regions are needed for the host-based garbage collection operation;
determining an over-provisioning amount for the two or more regions.

6. The method of claim 4, wherein partitioning the plurality of storage devices includes dynamically adjusting the two or more regions as workload of the storage system changes.

7. The method of claim 1, further comprising:
after coalescing valid data in the one or more logical stripes, in the logical address space of the host system, classifying an incoming write request; and
selecting a logical stripe in which to place the incoming write request in accordance with classification criteria.

8. The method of claim 1, wherein the one or more logical stripes, in the logical address space of the host system, include a first logical stripe and a second logical stripe; and
the first logical stripe is used for data with a first set of characteristics and the second logical stripe is used for data with a second set of characteristics, distinct from the first set of characteristics.

9. The method of claim 1, wherein coalescing valid data in the one or more logical stripes includes:
migrating valid data between distinct logical stripes of the one or more logical stripes in the logical address space of the host system in accordance with migration criteria.

10. The method of claim 1, wherein sending instructions from the host system to the one or more storage devices to move valid data corresponding to the first contiguous sequence of valid logical addresses includes issuing one or more xcopy commands to the one or more storage devices.

11. The method of claim 1, wherein the instructions to move valid data comprise copy instructions that copy valid data corresponding to valid logical addresses in the one or more logical stripes, in the logical address space of the host system, from initial memory portions in the plurality of storage devices to different memory portions in the plurality of storage devices corresponding to new logical addresses in the one or more logical stripes in the logical address space of the host system.

12. The method of claim 1, further comprising:
for each contiguous sequence of valid logical addresses in the one or more logical stripes, in the logical address space of the host system, after sending said instructions, invalidating data corresponding to the first contiguous sequence of valid logical addresses at the first physical location in the physical address space.

13. The method of claim 1, further comprising:
in accordance with a determination that first garbage collection scheduling criteria of the storage system are met, triggering performance of the host-based garbage collection operation, wherein the first garbage collection scheduling criteria of the storage system are independent of second garbage collection scheduling criteria used to trigger performance of internal garbage collection operations within each storage device of the plurality of storage devices.

14. The method of claim 13, wherein performance of the host-based garbage collection operation is triggered so as to ensure that internal garbage collection operations within each storage device are minimized.

15. The method of claim 13, wherein the first garbage collection scheduling criteria include criteria corresponding to a write operation workload of the storage system, criteria corresponding to a projected workload of the storage system, or criteria corresponding to a number of empty logical stripes in the storage system.

16. The method of claim 1, further comprising:
repeatedly performing, over a period of time, said host-based garbage collection operation to ensure that at least a minimum number of logical stripes, in the logical address space of the host system and managed by the host system, are available in which to place write data.

17. The method of claim 1, wherein the method is controlled by the host system, which includes a client, on behalf of which, data is stored in the storage system.

18. The method of claim 1, wherein the plurality of storage devices comprises one or more flash memory devices.

19. The method of claim 1, wherein the one or more logical stripes is a group of two or more logical stripes.

20. A host system, comprising:
an interface for operatively coupling to a storage system having a plurality of storage devices;
one or more processors; and
memory storing one or more programs, which when executed by the one or more processors cause the host system that is distinct from the plurality of storage devices to perform a host-based garbage collection operation comprising:
identifying, in accordance with data storage information stored at the host system, one or more logical stripes, wherein each logical stripe of the one or more logical stripes is a distinct contiguous sequence of logical addresses in a logical address space of the host system, each logical stripe includes two or more contiguous sequences of valid logical addresses, which are separated from each other by one or more gaps, a size of each logical stripe is a same predetermined size, and logical addresses for each logical stripe in the logical address space of the host system are mapped to physical addresses in a physical address space of the plurality of storage devices by mapping information in the plurality of storage devices; and in accordance with the identifying, for each logical stripe of the one or more logical stripes, coalescing valid data, including:

for at least one contiguous sequence of valid logical addresses of the group of two or more contiguous sequences of valid logical addresses, in a logical stripe in the logical address space of the host system, sending instructions from the host system to one or more storage devices of the plurality of storage devices to move valid data corresponding to a first contiguous sequence of valid logical addresses from a first physical location in the physical address space to a second physical location in the physical address space; and for each respective logical stripe of the one or more logical stripes, repacking the two or more contiguous sequences of valid logical addresses, in the respective logical stripe in the logical address space of the host system, to a single contiguous set of logical addresses in a contiguous portion of a corresponding target logical stripe, in the logical address space of the host system, the corresponding target logical stripe comprising the respective logical stripe or another logical stripe distinct from the respective logical stripe, wherein the other logical stripe is a second contiguous sequence of logical addresses in the logical address space of the host system distinct from the first contiguous sequence of logical addresses in the logical address space of the host system.

21. The host system of claim 20, wherein the one or more programs include:

a compacting module having instructions for moving valid data corresponding to the first contiguous sequence of valid logical addresses, in the logical address space of the host system, from a first physical location in the physical address space to a second physical location in the physical address space, and for each logical stripe in the logical address space of the host system, repacking valid logical addresses in the respective logical stripe to a beginning of the respective logical stripe.

22. The host system of claim 20, wherein the one or more logical stripes is a group of two or more logical stripes.

23. A non-transitory computer readable storage medium, storing one or more programs configured for execution by one or more processors of a host system that is distinct from a plurality of storage devices in a storage system, the one or more programs including instructions that when executed by the one or more processors cause the host system to perform a host-based garbage collection operation, including:

identifying, in accordance with data storage information stored at the host system, one or more logical stripes, wherein each logical stripe is a distinct contiguous sequence of logical addresses in the logical address space of the host system, each logical stripe includes two or more contiguous sequences of valid logical addresses, which are separated from each other by one or more gaps, a size of each logical stripe of the one or more logical stripes is a same predetermined size, and logical addresses for each logical stripe in the logical address space of the host system are mapped to physical addresses in a physical address space of the plurality of storage devices by mapping information in the plurality of storage devices; and in accordance with the identifying, for each logical stripe in the one or more logical stripes, coalescing valid, including:

for at least one contiguous sequence of valid logical addresses of the group of two or more contiguous sequences of valid logical addresses, in a logical stripe in the logical address space of the host system, sending instructions from the host system to one or more storage devices of the plurality of storage devices to move valid data corresponding to a first contiguous sequence of valid logical addresses from a first physical location in the physical address space to a second physical location in the physical address space; and for each respective logical stripe of the one or more logical stripes, repacking the two or more contiguous sequences of valid logical addresses, in the respective logical stripe in the logical address space of the host system, to a single contiguous set of logical addresses in a contiguous portion of a corresponding target logical stripe, in the logical address space of the host system, the corresponding target logical stripe comprising the respective logical stripe or another logical stripe distinct from the respective logical stripe, wherein the other logical stripe is a second contiguous sequence of logical addresses in the logical address space of the host system distinct from the first contiguous sequence of logical addresses in the logical address space of the host system.

24. The non-transitory computer readable storage medium of claim 23, wherein the one or more logical stripes is a group of two or more logical stripes.

25. A storage system, comprising:

a plurality of storage devices;

one or more subsystems having one or more processors; and memory storing one or more programs, which when executed by the one or more processors cause the one or more subsystems to perform operations comprising:

at a host system that is distinct from the plurality of storage devices, performing a host-based garbage collection operation, comprising:

identifying, in accordance with data storage information stored at the host system, one or more logical stripes, wherein each logical stripe is a distinct contiguous sequence of logical addresses in a logical address space of the host system, each logical stripe includes two or more contiguous sequences of valid logical addresses, which are separated from each other by one or more gaps, a size of each logical stripe of the one or more logical stripes is a same predetermined size, and logical addresses for each logical stripe in the logical address space of the host system are mapped to physical addresses in a physical address space of the plurality of storage devices by mapping information in the plurality of storage devices; and in accordance with the identifying, for each logical stripe in the one or more logical stripes, coalescing valid data, including:

for at least one contiguous sequence of valid logical addresses of the group of two or more contiguous sequences of valid logical addresses, in a logical stripe in the logical address space of the host system, sending instructions from the host system to one or more storage devices of the plurality of storage devices to move valid data corresponding to a first contiguous sequence of valid logical addresses from a first physical location in the physical address space to a second physical location in the physical address space; and for each respective logical stripe of the one or more logical stripes, repacking the two or more contiguous sequences of valid logical addresses, in the respective logical stripe in the logical address space of the host system, to a single contiguous set of logical addresses in a contiguous portion of a corresponding target logical stripe, in the logical address space of the host system, the corresponding target logical stripe comprising the respective logical stripe or another logical stripe distinct from the respective logical stripe, wherein the other logical stripe is a second contiguous sequence of logical addresses in the logical address space of the host system distinct from the first contiguous sequence of logical addresses in the logical address space of the host system.

26. The storage system of claim 25, wherein the one or more logical stripes is a group of two or more logical stripes.

* * * * *